US008176379B2

(12) United States Patent
Cho et al.

(10) Patent No.: US 8,176,379 B2
(45) Date of Patent: May 8, 2012

(54) APPARATUS AND METHOD FOR PROCESSING RECEIVED DATA IN A BROADBAND WIRELESS COMMUNICATION SYSTEM

(75) Inventors: Hyun-Sang Cho, Yongin-si (KR); Sang-Hyo Kim, Seoul (KR); Joong-Ho Jeong, Seoul (KR); Bong-Gee Song, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1265 days.

(21) Appl. No.: 11/903,090

(22) Filed: Sep. 20, 2007

(65) Prior Publication Data

US 2008/0072115 A1      Mar. 20, 2008

(30) Foreign Application Priority Data

Sep. 20, 2006 (KR) .................. 10-2006-0091476

(51) Int. Cl.
*H03M 13/17* (2006.01)
*H03M 13/33* (2006.01)
(52) U.S. Cl. ........................ 714/751; 714/758
(58) Field of Classification Search .............. None
See application file for complete search history.

(56) References Cited

U.S. PATENT DOCUMENTS

| 5,945,931 | A * | 8/1999 | Tahara et al. ................ 341/50 |
| 6,658,605 | B1 * | 12/2003 | Yoshida et al. ............. 714/702 |
| 7,873,026 | B2 | 1/2011 | Cho et al. |
| 2002/0122411 | A1 | 9/2002 | Zimmerman et al. |
| 2002/0154620 | A1 * | 10/2002 | Azenkot et al. ............. 370/347 |
| 2005/0226243 | A1 * | 10/2005 | Zhai et al. .................. 370/389 |
| 2005/0286451 | A1 | 12/2005 | Kim et al. |
| 2006/0195767 | A1 * | 8/2006 | Ihm et al. .................. 714/776 |

FOREIGN PATENT DOCUMENTS

| KR | 1020050014315 | 2/2005 |
| KR | 1020050015309 | 2/2005 |
| KR | 1020070004389 | 1/2007 |

* cited by examiner

*Primary Examiner* — Cynthia Britt
*Assistant Examiner* — Dipakkumar Gandhi
(74) *Attorney, Agent, or Firm* — The Farrell Law Firm, P.C.

(57) ABSTRACT

A method for processing data of a received frame in a receiver of a broadband wireless communication system. The received data processing method includes extracting, from control information for data of one frame having multiple bursts, burst sizes of bursts constituting the frame and modulation scheme information applied to the frame; assigning burst identifiers (IDs) used for identifying the bursts, and assigning burst partial IDs to data concatenations having concatenation sizes based on the burst sizes and the modulation scheme information; forming, in a memory, burst regions for storing the data concatenations according to the burst IDs; dividing received data of one slot included in the frame into data concatenations based on the concatenation sizes, and decoding the data concatenations; and sequentially storing the decoded data concatenations in the memory according to a burst ID and a burst partial ID corresponding to each of the decoded data concatenations.

10 Claims, 19 Drawing Sheets

| | 1 BIT | 1 BIT | 5 BIT | 8 BIT | 2 BIT | 3 BIT | 9 BIT | 1 BIT | 3 BIT |
|---|---|---|---|---|---|---|---|---|---|
| JRST 0 | EOC | CID | BURST_INDX | FEC CODE TYPE | REPETITION | BOOSTING | BURST_SZ | RESERVE | CTC ITERATION |
| JRST 1 | EOC | CID | BURST_INDX | FEC CODE TYPE | REPETITION | BOOSTING | BURST_SZ | RESERVE | CTC ITERATION |
| ... | | | | | | | | | |
| JRST 14 | EOC | CID | BURST_INDX | FEC CODE TYPE | REPETITION | BOOSTING | BURST_SZ | RESERVE | CTC ITERATION |
| JRST 15 | EOC | CID | BURST_INDX | FEC CODE TYPE | REPETITION | BOOSTING | BURST_SZ | RESERVE | CTC ITERATION |

FIG.5

APPARATUS AND METHOD FOR PROCESSING RECEIVED DATA IN A BROADBAND WIRELESS COMMUNICATION SYSTEM

PRIORITY

This application claims the benefit under 35 U.S.C. §119(a) of a Korean Patent Application filed in the Korean Intellectual Property Office on Sep. 20, 2006 and assigned Serial No. 2006-91476, the disclosure of which is incorporated herein by reference.

BACKGROUND OF THE INVENTION

1. Field of the Invention

The present invention relates generally to a reception apparatus and method in a Broadband Wireless Access (BWA) communication system, and in particular, to an apparatus and method for processing data in a modem for a Mobile Station (MS) used in a Wireless Broadband Internet (Wibro) system.

2. Description of the Related Art

Technology generally used to provide a data service to users in the current wireless communication environment are classified into a $2.5^{th}$ Generation (2.5G) or $3^{rd}$ Generation (3G) cellular mobile communication technology, such as Code Division Multiple Access 2000 1x Evolution Data Optimized (CDMA2000 1xEVDO), General Packet Radio Services (GPRS) and Universal Mobile Telecommunication Service (UMTS), and a Wireless Local Area Network (LAN) technology, such as Institute of Electrical and Electronics Engineers (IEEE) 802.11 Wireless LAN, and HiperLAN/2.

The most noticeable characteristic of the 3G cellular mobile communication technology for providing voice services over the circuit-based network is to provide packet data services in which subscribers can access the Internet in the broadband wireless communication environment.

However, the cellular mobile communication network is limited in its support of the high-speed packet data services. For example, the CDMA2000 1xEVDO system, a synchronous mobile communication system, supports a data rate of up to about 2.4 Mbps.

Aside from the evolution of the mobile communication technologies, various local wireless access technologies such as IEEE 802.16-based Wireless LAN, HiperLAN/2 and Bluetooth have appeared. However, such technologies cannot guarantee the mobility level being equivalent to that of the cellular mobile communication system. Nevertheless, the local wireless access technologies are presented as an alternative for providing high-speed data services in the wireless environment, replacing the wire communication networks such as a cable modem and Digital Subscriber Line (DSL), in a Hot Spot zone such as a public space and school, or in the home network environment.

However, the Wireless LAN, providing the high-speed data services, is limited in providing public network services to users not only due to highly limited mobility and narrow coverage area but also due to radio interference.

Therefore, various attempts are being made to overcome the limitations. For example, extensive research is being conducted on the Portable Internet technology proposed to make the best use of the cellular mobile communication system and the Wireless LAN. Particularly, active research is being conducted on the Wireless Broadband Internet (Wibro) system, which is a typical example of the Portable Internet technology now under standardization and development. The Wibro system can provide high-speed data services in the indoor/outdoor stationary environments and the pedestrian-speed and mid/low-speed (about 60 Km/h) mobile environment, using various types of mobile stations. A detailed description will now be made of the Wibro system.

The Wibro system, a technology evolved one step from the 2.3-GHz band Wireless Local Loop (WLL) technology, covers the $4^{th}$ Generation (4G) mobile communication industry field, and can cover the wider industry field compared to 3G IMT-2000. Therefore, Wibro is also referred to as a $3.5^{th}$ Generation (3.5G) mobile communication technology.

To provide a Wibro service with application of Wibro technology, the system and Mobile Station (MS) corresponding thereto are now under active development. There is no specific standard on a modem for the Wibro mobile station. For convenience, the Wibro-based broadband wireless communication system will also be referred to herein as a broadband wireless communication system.

FIG. 1 illustrates a Wibro data frame format used in the general broadband wireless communication system.

Shown in FIG. 1 is a data frame format based on the 802.16e standard for providing a broadband wireless communication service such as the Wibro service, and the Wibro data frame used in the Wibro communication system is time-divided into a Downlink (DL) region and an Uplink (UL) region. In the downlink-to-uplink transition interval, a Transmit/receive Transition Gap (TTG) forms a guard time, and in the uplink-to-downlink transition interval, a Receive/transmit Transition Gap (RTG) forms a guard time. In FIG. 1, the horizontal axis indicates Orthogonal Frequency Division Multiple Access (OFDMA) symbol numbers, and the vertical axis indicates subchannel logical numbers.

As to the downlink, a preamble for synchronization acquisition is disposed in a $K^{th}$ OFDMA symbol, and broadcast data information to be commonly received by mobile stations, such as a Frame Control Header (FCH) and a DownLink MAP (DL-MAP), is disposed in a $(K+1)^{th}$ OFDMA symbol. The FCH, composed of two subchannels, delivers basic information on subchannel, ranging and modulation scheme. DownLink bursts (DL bursts), for example, DL burst#1 to DL burst#6, are disposed over $(K+3)^{th}$ to $(K+15)^{th}$ OFDMA symbols.

Next, as to the uplink, UpLink bursts (UL bursts) are disposed over $(K+17)^{th}$ to $(K+26)^{th}$ OFDMA symbols. Further, a ranging subchannel for ranging is disposed over the $(K+17)^{th}$ to $(K+26)^{th}$ OFDMA symbols.

In the Wibro data frame format used in the IEEE 802.16e communication system, the downlink frame, as described above, includes a preamble region, an FCH region, a DL-MAP region, a UL-MAP region, and multiple DL burst regions.

The preamble region is a region for transmitting a synchronization signal, or a preamble sequence, for synchronization acquisition between a transmitter, or a Base Station (BS), and a receiver, or a Mobile Station (MS). That is, the preamble region is needed to match synchronization with the data transmitted from the base station, and a modem of the mobile station extracts synchronization information from the preamble using several methods.

The FCH region, composed of 4 subchannels, delivers basic information on a DL-MAP, such as length and modulation scheme of the DL-MAP. For example, by analyzing the FCH information, the mobile station can determine a size of the DL-MAP, and also can determine which of Frequency Reuse Factors (hereinafter referred to as 'reuse'), for example, reuse=1 and reuse=3, used in the base station is applied. The modulation scheme of the DL-MAP is changed on a frame-by-frame.

The DL-MAP region is a region for sending a DL-MAP message, and has a variety of information used for extracting information such as position and size of the data in the downlink frame, and providing a service to the mobile station. By analyzing the DL-MAP information, the mobile station can extract the data in the frame.

With use of the DL burst regions, the mobile station extracts the data based on the general data information, for example, the information acquired by analyzing the DL-MAP.

The subchannel described herein means a channel composed of multiple subcarriers, and a predetermined number of subcarriers constitute one subchannel according to system conditions. One frame is composed of several symbols, for example, 42 symbols in the Wibro system, and the symbols each can be divided into several subchannels. The symbol can be regarded as a unit in which the frame is divided in the time domain, and a data size in one symbol depends on the format of the frame.

The uplink frame in the Wibro data frame format used in the IEEE 802.16e communication system includes, as described above, multiple UL burst regions and the ranging subchannel region. The ranging subchannel region is a region over which ranging subchannels for ranging are transmitted, and by using the UL burst regions, the mobile station extracts data based on the general data information, for example, information acquired by analyzing the UL-MAP.

To extract data from the downlink regions of the Wibro data frame according to the 802.16e standard, the following data processing order is needed.

1) A process of analyzing reuse information in the FCH, and FCH information used for acquiring the DL-MAP size information.

2) A process of performing DL-MAP decoding to acquire a variety of information used for extracting normal bursts except for Hybrid Automatic ReQuest (HARQ) bursts depending on information in the DL-MAP. HARQ bursts and normal bursts can coexist in one frame, and data allocation in the frame can be changed on a frame-by-frame basis.

3) A process of extracting normal bursts based on the information acquired from the DL-MAP.

When the data processing process is performed in order of 1), 2) and 3), data reception for one frame is completed. Generally, a Wibro modem is a very important component in the data processing scheme, as a high data rate (for example, downlink 10 Mbps) is required and the data structure is complex like the Partial Usage Subchannel (PUSC), Full Usage SubChannel (FUSC), reuse factor, etc.

FIG. 2 illustrates a structure of a data processing apparatus in the general broadband wireless communication system.

Before a description of FIG. 2 is given, a structure of an 802.16e-based Wibro modem is roughly divided into a synchronization unit, a reception (Rx) data processing unit including a Convolutional Turbo Code (CTC) decoder and a Convolutional Code (CC) decoder, and a transmission (Tx) data processing unit including a Medium Access Control (MAC) entity, a CTC encoder and a CC encoder. In this Wibro modem structure, shown in FIG. 2 is a block structure for data decoding processing in the Rx data processing unit.

Shown in FIG. 2 is a block structure for data decoding processing in the conventional Rx data processing unit, and the block structure includes a channel estimator 210, a decoder 230, and a MAP decoder 250.

The channel estimator 210 estimates channels based on a pilot in Fast Fourier Transform (FFT)-processed data. The data compensation is achieved according to the estimated channels.

The decoder 230 operates according to types of the CTC decoder and the CC decoder. With use of the decoder 230, data error occurring during data transmission is corrected.

The MAP decoder 250 processes FCH and DL-MAP in the frame format defined in 802.16e, shown in FIG. 1. By processing the FCH and the DL-MAP by means of the MAP decoder 250, a Wibro modem of the receiver extracts normal data.

Generally, a structure of an 802.16e-based Wibro modem is roughly divided into a synchronization unit, an Rx data processing unit including the CTC and CC decoders, and a Tx data processing unit including the CTC and CC encoders.

Shown in FIG. 2 is a simple structure realized based on the 802.16e standard, and the use of this structure may have the following problems.

Several data bursts can be carried on one frame, and in the structure of starting data processing after one data burst is fully transmitted, when data is transmitted long along the time axis, the data rate may decrease considerably. In the structure of channel-estimating only the corresponding data after one data is fully transmitted, channel estimation performance degrades, and in the mixed structure of PUSC, FUSC and reuse in the frame, processing of several data bursts increases the complexity. In addition, as data processing is performed after one data burst is fully transmitted, a large number of decoders need to be used to acquire a necessary data rate.

The Wibro modem can have a unique data processing structure according to its manufacturer, and there is a need for efficient block design taking data processing speed and efficiency into account.

SUMMARY OF THE INVENTION

An aspect of the present invention is to address at least the problems and/or disadvantages described above and to provide at least the advantages described below. Accordingly, an aspect of the present invention is to provide an apparatus and method for processing data on a symbol-by-symbol basis in a receiver of a Wibro system.

Another aspect of the present invention is to provide an apparatus and method for processing HARQ bursts in a receiver of a Wibro system.

According to one aspect of the present invention, there is provided a method for processing data of a received frame in a receiver of a broadband wireless communication system. The received data processing method includes extracting, from control information for data of one frame having multiple bursts, burst sizes of bursts constituting the frame and modulation scheme information applied to the frame; assigning burst identifiers (IDs) used for identifying the bursts, and assigning burst partial IDs to data concatenations having concatenation sizes based on the burst sizes and the modulation scheme information; forming, in a memory, burst regions for storing the data concatenations according to the burst IDs; dividing received data of one slot included in the frame into data concatenations based on the concatenation sizes, and decoding the data concatenations; and sequentially storing the decoded data concatenations in the memory according to a burst ID and a burst partial ID corresponding to each of the decoded data concatenations.

According to another aspect of the present invention, there is provided an apparatus for processing data of a received frame in a receiver of a broadband wireless communication system. The received data processing apparatus includes a control information decoder for receiving control information for data of one frame having multiple bursts, and decoding the received control information; a controller for extracting, from the decoded control information, burst sizes of bursts constituting the frame and modulation scheme information applied to the frame, assigning burst identifiers (IDs) used for identifying the bursts, and assigning burst partial IDs to data concatenations having concatenation sizes based on the burst sizes and the modulation scheme information; a decoding unit for dividing received data of one slot included in the frame into data concatenations based on the data concatenation sizes, and decoding the data concatenations; and a burst memory unit having burst regions for storing the data concatenations according to the burst IDs, the burst memory unit sequentially storing the decoded data concatenations according to a burst ID and a burst partial ID corresponding to each of the decoded data concatenations output from the decoding unit.

BRIEF DESCRIPTION OF THE DRAWINGS

The above and other aspects, features and advantages of the present invention will become more apparent from the following detailed description when taken in conjunction with the accompanying drawings in which:

FIG. 5 illustrates an exemplary structure of a burst table in a broadband wireless communication system according to the first embodiment of the present invention;

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

Before a description of the present invention is given, a brief description will now be made of the, Wibro-based broadband wireless communication system to which the present invention is applicable.

Generally, a structure of the 802.16e-based Wibro modem is roughly divided into a synchronization unit, an Rx data processing unit including a CTC decoder and a CC decoder, and a Tx data processing unit including a MAC entity, a CTC encoder and a CC encoder. The present invention provides a scheduler operation for controlling the entire operation of the Rx data processing unit in the Rx data processing unit, which is a symbol level block, and a structure thereof.

The 802.16e standard can employ several data processing scheduling schemes according to its analysis. Therefore, the present invention provides an apparatus structure capable of obtaining the highest possible (or full) data rate and increasing the performance of the decoder including a CC decoder and a CTC decoder as high as possible, and a scheme thereof. In addition, the present invention reduces the number of decoders used for obtaining the full data rate, for example, 10-Mbps data rate, and minimizes delay between the blocks, thereby facilitating stable performance even with many data processing processes.

A symbol scheduler for processing data received on a symbol-by-symbol basis, for the Wibro modem according to the present invention, is designed to be suitable for data reception, based on the 802.16e communication system, and processes data on a symbol-by-symbol basis, thereby facilitating a high data rate. By processing data on a symbol-by-symbol basis in this way, the present invention can solve the problems occurring when processing data disposed along the time domain, and thus can optimize the number of CTC and CC decoders used for obtaining the necessary data rate. Further, the present invention can simplify the complex frame formats of PUSC, FUSC, reuse, etc., thereby facilitating smooth data processing.

With reference to the accompanying drawings, a detailed description will now be made of a block structure and operation of an Rx data processing unit according to an embodiment of the present invention.

Figure 1:
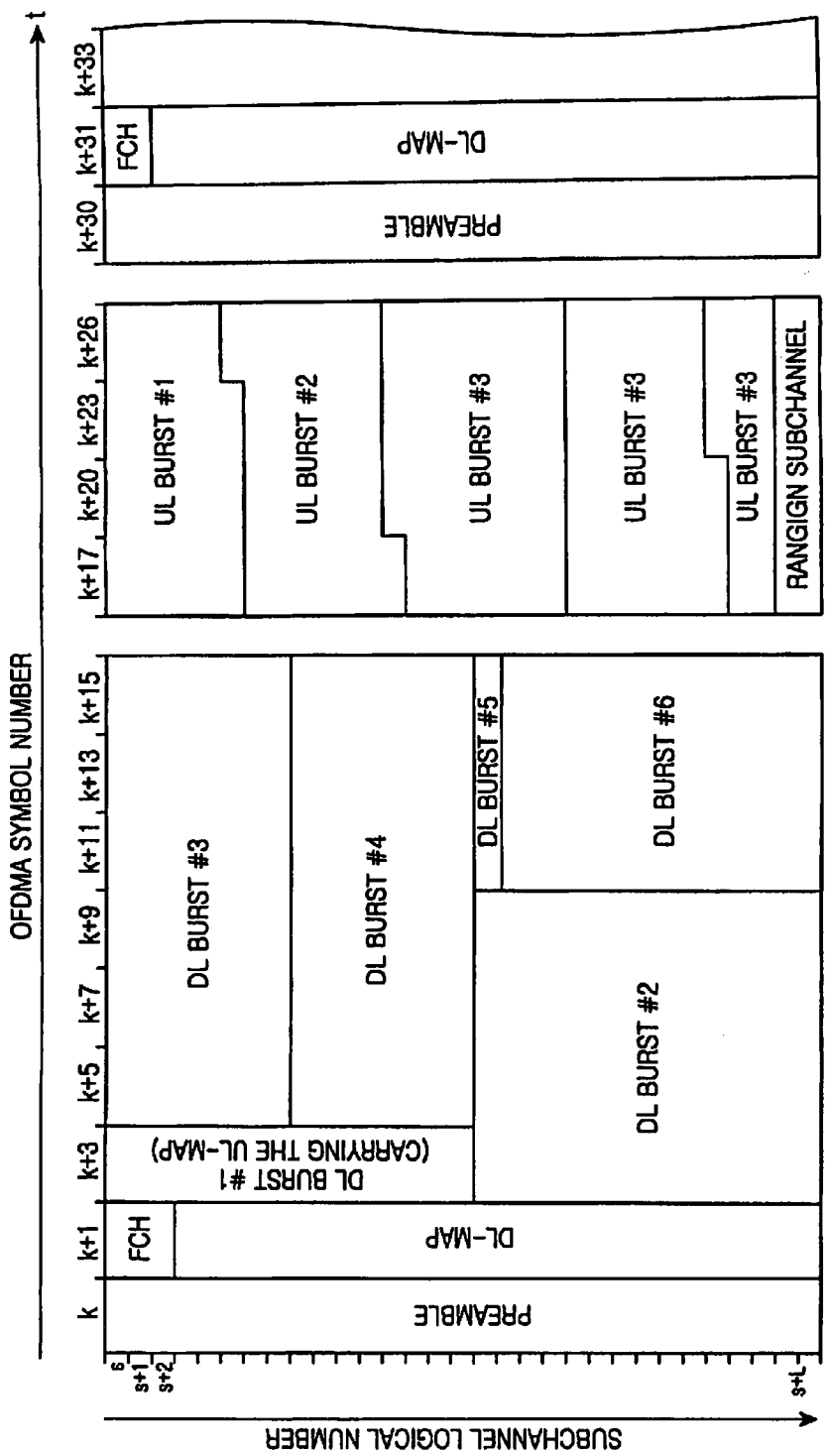
FIG. 1 illustrates a Wibro data frame format used in the general broadband wireless communication system.
Figure 2:
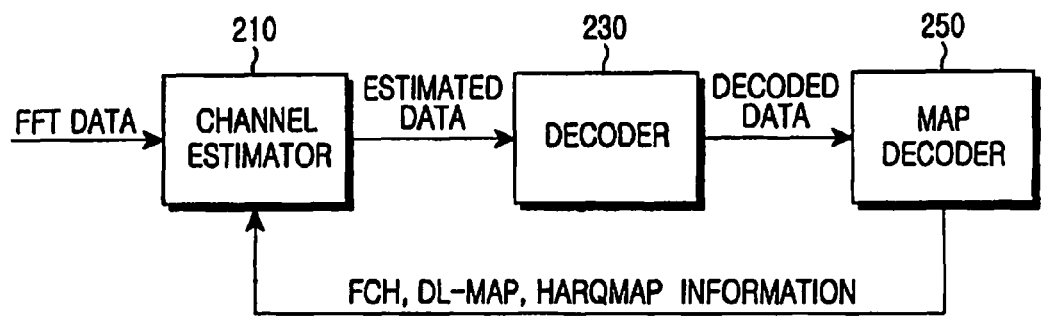
FIG. 2 illustrates a structure of a data processing apparatus in the general broadband wireless communication system.
Figure 3:
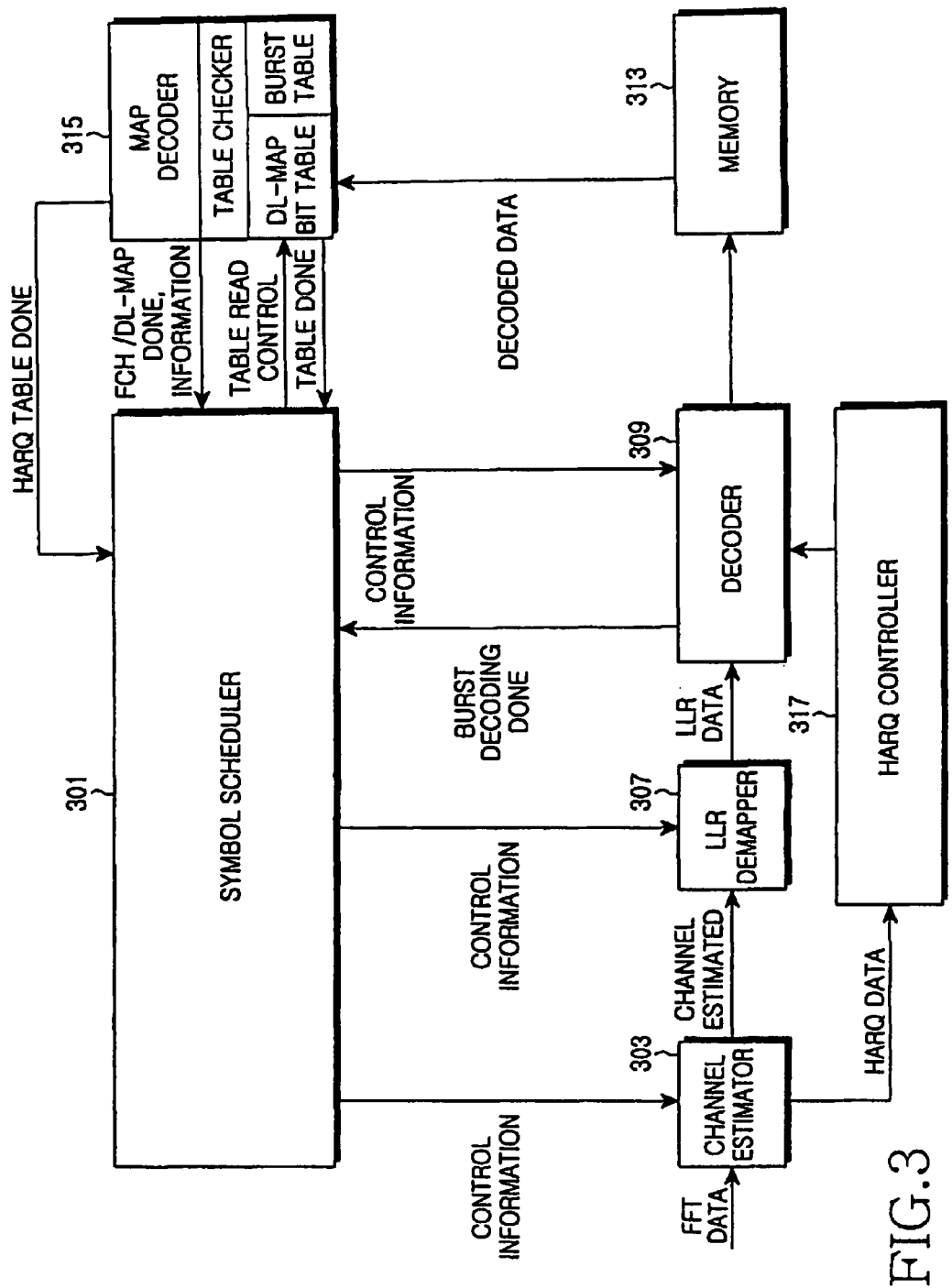
FIG. 3 illustrates a block structure of an Rx data processing unit of a broadband wireless communication system's receiver according to a first embodiment of the present invention.

FIG. 3 illustrates a block structure of an Rx data processing unit of a broadband wireless communication system receiver according to a first embodiment of the present invention.

Shown in FIG. 3 is a block structure of an Rx data processing unit according to the first embodiment of the present invention. With reference to FIG. 3, a definition will be given of the entire block structure according to the first embodiment of the present invention, i.e. the structures of a symbol scheduler, a Log-Likelihood Ratio (LLR) demapper, a memory, a slot combiner, a decoder, an HARQ controller, and the like, and the entire data flow according thereto.

Referring to FIG. 3, an Rx data processing unit includes a symbol scheduler 301, a channel estimator 303, an LLR demapper 307, a decoder 309, a memory 313, a MAP decoder 315, and an HARQ controller 317.

The symbol scheduler 301 controls the blocks in the Rx data processing unit shown in FIG. 3, and manages all of the information. A detailed description of an internal structure and operation of the symbol scheduler 301 will be provided with reference to FIG. 4.

The channel estimator 303 estimates channels of FFT-processed input data, for data compensation.

The LLR demapper 307 performs LLR calculations to perform CC decoding and CTC decoding. The CC decoding and CTC decoding schemes are Soft-Decision based schemes. Therefore, the LLR demapper 307 performs a soft decision operation according to the decoding schemes.

The decoder 309 includes a CC decoder(s) and a CTC decoder(s), and performs decoding on the data CC/CTC-decoded by the CC decoder and CTC decoder. In this case, the decoder 309 calculates a trellis diagram based on the soft decision result calculated by the CC decoder and CTC decoder, thereby acquiring the original data.

The memory 313 performs a function of storing the decoded data output from the decoder 309 in units of data regions, i.e. in units of data bursts. The memory 313 includes a burst memory, and can also include a memory controller for controlling a memory operation.

The MAP decoder 315 extracts frame-related information from Frame Control Head (FCH) and DL-MAP data, and transfers to the symbol scheduler 301 the extracted information and each block that needs the extracted information.

The HARQ controller 317 determines and controls ACK/NACK for HARQ data information.

Figure 4:
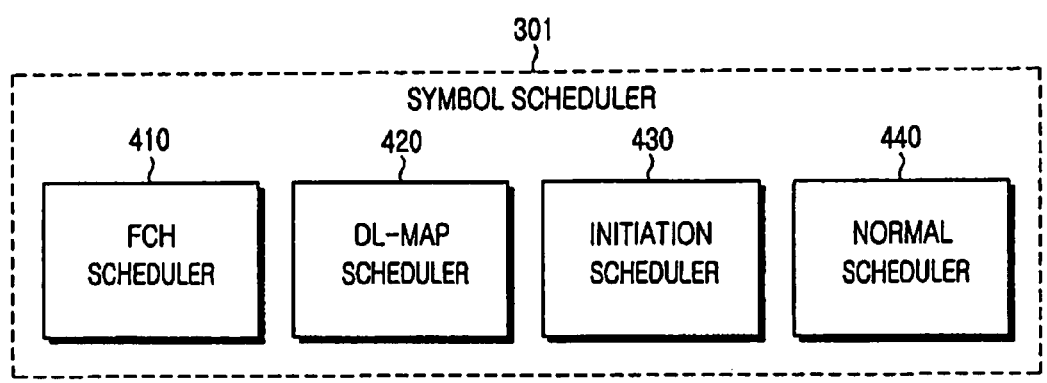
FIG. 4 illustrates an internal structure of a symbol scheduler according to the first embodiment of the present invention.

With reference to FIG. 4, a detailed description will now be made of the symbol scheduler 301 shown in FIG. 3 according to the first embodiment of the present invention.

FIG. 4 illustrates an internal structure of a symbol scheduler according to the first embodiment of the present invention.

Referring to FIG. 4, the symbol scheduler according to the first embodiment of the present invention is roughly divided into four parts. That is, the symbol scheduler 301 for managing an operation, i.e. status, of the input/output for all symbol blocks, includes an FCH scheduler 410 for managing information used for performing FCH decoding, a DL-MAP scheduler 420 for managing information used for performing DL-MAP decoding, an initiation scheduler 430 for initializing a memory and setting a data size, and a normal scheduler 440 for managing information used for performing normal burst decoding.

A preferred operation of the symbol scheduler 301 according to the present invention will now be described.

The symbol scheduler 301 manages the status for the Rx data processing unit. To process data in one frame, the symbol scheduler 301 performs the following process.

1) The symbol scheduler 301 determines if the data synchronization is matched. If the data synchronization is mismatched, the corresponding frame data cannot be processed. Therefore, the symbol scheduler 301 determines whether to process the data depending on the synchronization information.

2) The symbol scheduler 301 extracts an FCH in the frame. The FCH is transmitted in a position fixed in a PUSC region of a first symbol with Quadrature Phase Shift Keying (QPSK) ½ and repetition=4. In this case, upon receipt of a signal indicating the completion of the FCH decoding from the MAP decoder 315, the symbol scheduler 301 enters (or transitions to) a DL-MAP decoding mode.

3) The symbol scheduler 301 extracts a DL-MAP in the frame. The DL-MAP exists in a PUSC region depending on the reuse information and size information designated in the FCH. The MAP decoder 315 decodes the DL-MAP based on the information extracted from the FCH, and then generates a burst table and a bitmap table. After the table generation is completed, the symbol scheduler 301 enters an HARQ MAP check mode.

4) The symbol scheduler 301 determines if there is a HARQ MAP in the frame. If there is a HARQ MAP, the symbol scheduler 301 transitions to an HARQ MAP mode, and if there is no HARQ MAP, the symbol scheduler 301 transitions to a data mode. If there is the HARQ MAP, the MAP decoder 315 provides the corresponding information.

5) The symbol scheduler 301, if it enters the data mode, performs symbol-based (or symbol-by-symbol) data processing based on bitmap information. When all the data processing designated in the burst table is completed, the symbol scheduler 301 waits until the next frame is transmitted.

Each step of the above process is defined herein as a state, and the state is managed in the scheduler and will be referred to herein as a 'scheduler state'. More specifically, the step of determining if the data synchronization is matched is defined as an 'initial state', the step of extracting an FCH in the frame, i.e. the mode of decoding FCH information, is defined as an 'FCH mode', the step of extracting a DL-MAP in the frame, i.e. the mode of decoding the DL-MAP, is defined as a 'DL-MAP mode', and the step of checking if there is an HARQ MAP in the frame is defined as an 'HARQ mode'. The HARQ MAP does not necessarily exist in the frame. Finally, when all the MAP information is fully extracted, the corresponding state is defined as a 'data mode' for extracting data.

The sub-schedulers, i.e. the FCH scheduler 410, the DL-MAP scheduler 420, the initiation scheduler 430 and the normal scheduler 440, operate according to the scheduler states. Operations of the sub-schedulers are as follows.

The FCH scheduler 410 performs state management when the state of the symbol scheduler 301 is 'FCH mode'.

The DL-MAP scheduler 420 performs state management when the state of the symbol scheduler 301 is 'DL-MAP mode'.

The initiation scheduler 430 performs state management for each of the occasions (i) where the state of the symbol scheduler 301 is 'FCH information-setting state' for setting information used for performing FCH decoding in each block, (ii) where the state of the symbol scheduler 301 is 'DL-MAP information-setting state' for setting basic information used for DL-MAP decoding in each of the blocks, and (iii) where the state of the symbol scheduler 301 is 'burst information-setting state' for setting, for example, a burst size in a burst memory.

In the 'FCH information-setting state', the initiation scheduler 430 sets the information necessary for the FCH extraction in each of the blocks. The information necessary for FCH extraction can include FCH size, repetition (number of repetitions), data type, etc. In the 'DL-MAP information-setting state', the initiation scheduler 430 sets the information necessary for DL-MAP extraction in each of the blocks. The information necessary for DL-MAP extraction can include DL-MAP size, repetition, data type, decoding type, etc. In the 'burst information-setting state', the initiation scheduler 430 sets the information necessary for extracting normal data in each of the blocks. The information extracted from the DL-MAP is converted into a table by means of the MAP decoder, and the table values are set in each of the blocks, for decoding. The normal scheduler 440 performs state management when the state of the symbol scheduler 301 is 'normal mode'.

Operations of the sub-schedulers will now be described in more detail.

Upon receipt of a 'frame start' signal, the symbol scheduler 301 starts symbol decoding. Thereafter, the symbol scheduler 301 activates the initiation scheduler 430 to set the FCH decoding-related information. If the FCH decoding-related information is set, the FCH scheduler 410 operates based on this information to perform the FCH decoding.

Next, the initiation scheduler 430 sets the DL-MAP information acquired as a result of the FCH decoding, in the related block(s). Then, the DL-MAP scheduler 420 operates to perform DL-MAP decoding. Thereafter, the initiation scheduler 430 sets the information for normal burst decoding in the related block(s) based on the burst table and bitmap table obtained as a result of the DL-MAP decoding. Finally, the normal scheduler 440 operates to decode the normal bursts.

The first embodiment of the present invention, described above, performs symbol-based data processing. That is, when channel estimation of every symbol is completed, the first embodiment reads data of the symbol and directly performs decoding thereon. To perform the symbol-based data processing, the first embodiment of the present invention proposes two new configuration tables: a burst table and a bitmap table.

Figure 6:
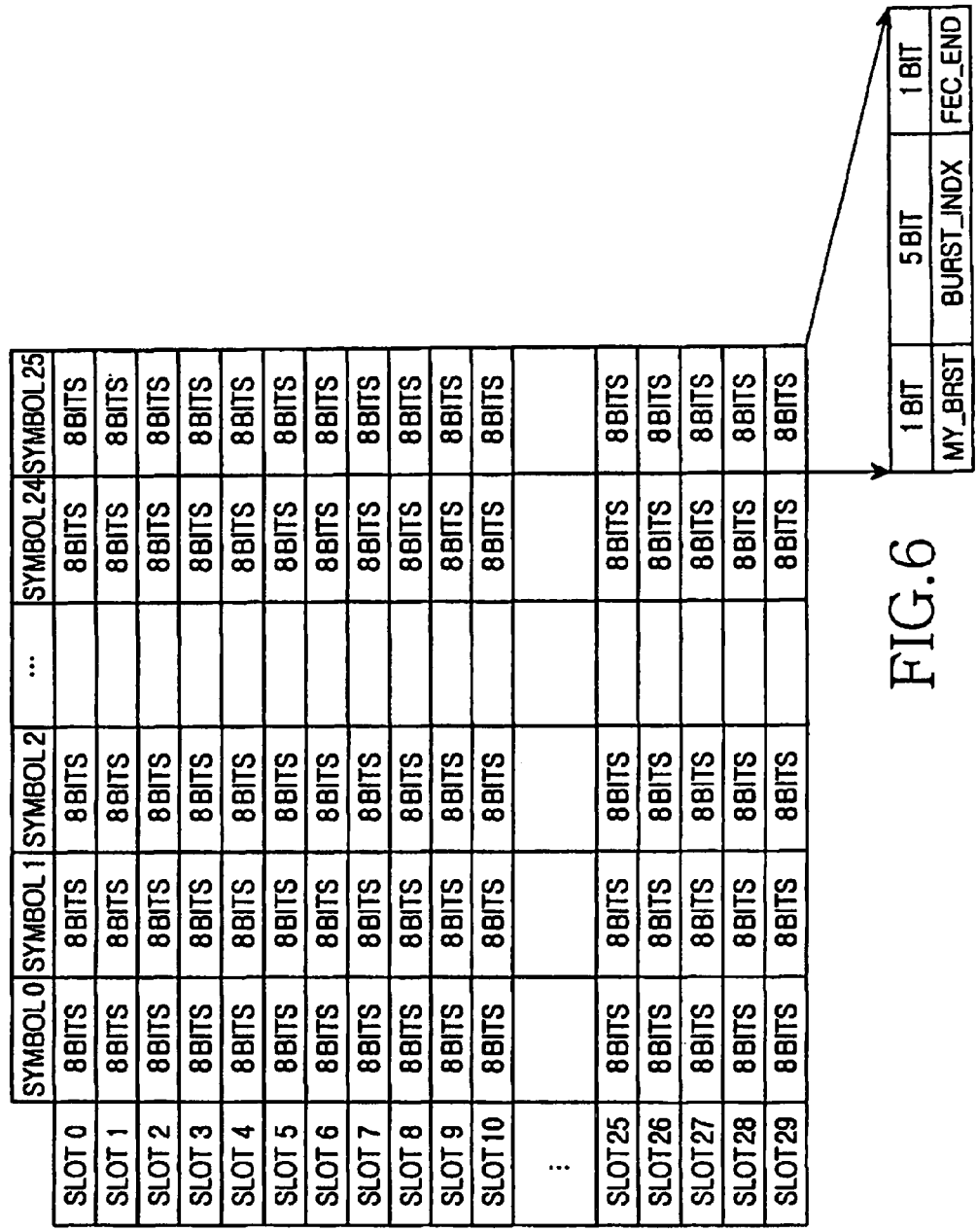
FIG. 6 illustrates an exemplary structure of a bitmap table in a broadband wireless communication system according to the first embodiment of the present invention.

The two tables are both generated in the MAP decoder 315, and embodiments of the burst table and the bitmap table are shown in FIGS. 5 and 6, respectively.

FIG. 5 illustrates an exemplary structure of a burst table in a broadband wireless communication system according to the first embodiment of the present invention.

Referring to FIG. 5, as to the burst table, burst information obtained from a DL-MAP by means of burst Information Elements (IEs) is assigned a unique number for every burst, and then stored in a buffer.

As shown in FIG. 5, the partial details of the burst table are as follows. The burst table includes 'End Of Contents' (EOC) indicating if the corresponding point is an end of the burst table, 'Connection ID' (CID) used for determining whether the burst of the corresponding table is a burst that the current mobile station should check, or a burst belonging to another mobile station, 'Burst_indx' (having the same meaning as burst ID described in FIGS. 9 to 19) indicating a number assigned to every burst, 'FEC code type' that indicates Frame Error Correction (FEC) code type and includes CTC information, CC information and encoding information, 'repetition' indicating the number of repetitions, 'boosting' indicating a data boosted level, 'Burst_sz' indicating a size of a data slot, and 'CTC iteration' designating the number of iterations in CTC decoding.

Several data bursts can be transmitted in one frame, and the number of transmissions is subject to change every frame. The present invention can store as much data as the table and finally set the EOC to '1', thereby detecting the number of data bursts transmitted in the corresponding frame and reducing the unnecessary operation. In addition, Portable Internet, for example, the Wibro standard, can define the boosting of 9 dB~12 dB for each data burst, and the boosting is designated by means of the DL-MAP.

FIG. 6 illustrates an exemplary structure of a bitmap table in a broadband wireless communication system according to the first embodiment of the present invention.

Referring to FIG. 6, the bitmap table is a table for indicating positions and burst numbers of data in one frame to enable symbol-based data processing, and the partial details of the bitmap table are as follows.

As shown in FIG. 6, the bitmap table includes 'My_brst' indicating if a received burst is a burst corresponding to the current mobile station, 'Burst_indx' indicating a unique number assigned to every burst, and 'Fec_end' indicating that the data has reached a CC decoding and CTC decoding size. The Portable Internet, for example, the Wibro standard, divides one burst into several parts before transmission, and performs CC and CTC encoding on each of the divided parts. To decode the received burst in this manner, it is necessary to determine how many parts the received data is divided into, and whether the ports are processed to such an extent that they can now undergo CC and CTC decoding. In this way, it is possible to indicate CC and CTC decoding positions of the data concatenated using the 'Fec_end' signal as described above.

The symbol scheduler 301 operates based on the table information shown in FIGS. 5 and 6. A setting time of the two-table information is an end time of the DL-MAP decoding. If the DL-MAP decoding is completed, a configuration-done signal is input from the MAP decoder 315 to the symbol scheduler 301. Then, the symbol scheduler 301 first reads the configured burst table and presets corresponding information. Thereafter, the symbol scheduler 301 reads the bitmap table and processes data on the symbol-by-symbol basis.

With reference to the accompanying drawings, a description will be made of a processing process in the symbol scheduler 301. An operation of the symbol scheduler 301 is divided into a processing process for the case where there is an HARQ MAP, and a processing process for the case where there is no HARQ MAP, shown in FIGS. 7 and 8, respectively.

Figure 7:
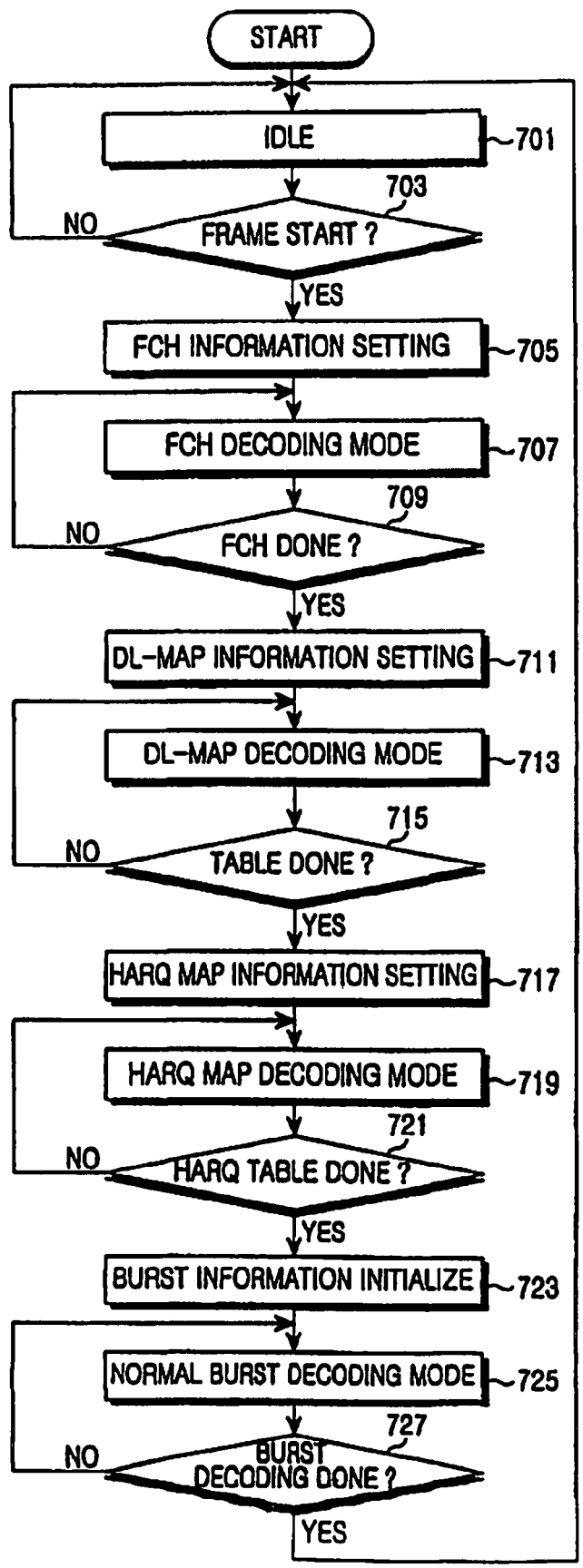
FIG. 7 illustrates a method for decoding FCH, DL-MAP and HARQ MAP in a symbol scheduler according to the first embodiment of the present invention.

FIG. 7 illustrates a method for decoding a FCH, a DL-MAP and an HARQ MAP in a symbol scheduler according to the first embodiment of the present invention. The symbol scheduler according to an embodiment of the present invention can be realized with a Finite State Machine.

Referring to FIG. 7, in step 701, the symbol scheduler 301 waits for the start of a new frame in an 'IDLE' state. That is, if a reset occurs as processing on a particular frame is completed, the symbol scheduler 301 waits in an 'IDLE mode'. The waiting in the IDLE mode continues until a 'frame start' signal occurs in step 703.

If the 'frame start' signal is generated in step 703, the symbol scheduler 301 proceeds to step 705 where it sets the FCH information (FCH information setting). That is, in step 705, the symbol scheduler 301 sets the information for the FCH decoding in the LLR demapper 307 and the memory 313. Here, the FCH is input to a PUSC region within 4 slots with 4 repetitions, and in this way, the symbol scheduler 301 sets the FCH size and repetition information in each of the blocks.

Thereafter, in step 707 the symbol scheduler 301 completes control for the FCH decoding. The FCH decoding, as shown in step 709, continues until an 'FCH Done' signal indicating completion of the FCH decoding is received from a MAP decoder 315.

Upon receipt of the 'FCH Done' signal in step 709, the symbol scheduler 301 proceeds to step 711 where it sets DL-MAP information in each of the blocks in the Rx data processing unit (DL-MAP information setting). That is, in step 711, the symbol scheduler 301 sets the information for the DL-MAP decoding. In other words, if the FCH decoding is completed in step 707, the symbol scheduler 301 can acquire such information as DL-MAP size, repetition, code, etc., and the symbol scheduler 301 sets this information in each of the blocks in the Rx data processing unit for data decoding processing.

Thereafter, in step 713, the symbol scheduler 301 controls each of the blocks in the Rx data processing unit to perform DL-MAP decoding in a DL-MAP decoding mode. Here, a table is generated by the MAP decoder 315 as a result of the DL-MAP decoding, and in this process, the symbol scheduler 301 waits, as shown in step 715, in the DL-MAP decoding mode until a 'TABLE Done' signal indicating completion of the table generation is received from the MAP decoder 315.

Upon receipt of the 'TABLE Done' signal from the MAP decoder 315 in step 715, the symbol scheduler 301 proceeds to step 717 where it sets HARQ MAP information (HARQ MAP information setting). That is, in step 717, the symbol scheduler 301 sets the information for decoding the HARQ MAP.

In step 719, the symbol scheduler 301 controls each of the blocks in the Rx data processing unit to perform HARQ MAP decoding in an HARQ MAP decoding mode. The HARQ MAP decoding process, as shown in step 721, continues until an 'HARQ TABLE Done' signal indicating completion of the HARQ MAP decoding is received from the MAP decoder 315.

Upon receipt of the 'HARQ TABLE Done' signal from the MAP decoder 315 in step 721, the symbol scheduler 301 proceeds to step 723 where it sets the burst information to an initial value (Burst information initialize). That is, in step 723, the symbol scheduler 301 sets the information for normal burst decoding. Such related information can be read from the burst table. In this case, the symbol scheduler 301 reads the information from the burst table, and sets code rate and FEC code type in the LLR demapper 307' CTC repetition in the decoder 309, and burst size information in the memory 313 which is a burst memory.

Thereafter, in step 725, the symbol scheduler 301 controls each of the blocks in the Rx data processing unit to decode the normal bursts in a normal burst decoding mode. The symbol scheduler 301, as shown in step 727, waits in the normal burst decoding mode until a 'Burst decoding Done' signal indicating completion of the burst decoding is received from the decoder 309. Finally, upon receipt of the 'Burst decoding Done' signal from the decoder 309 in step 727, the symbol scheduler 301 ends the frame processing and then returns to step 701 in response to, for example, a reset, and waits for the start of a new frame.

A description will now be made of a processing process of the symbol scheduler 301 for the case where there is no HARQ MAP.

Figure 8:
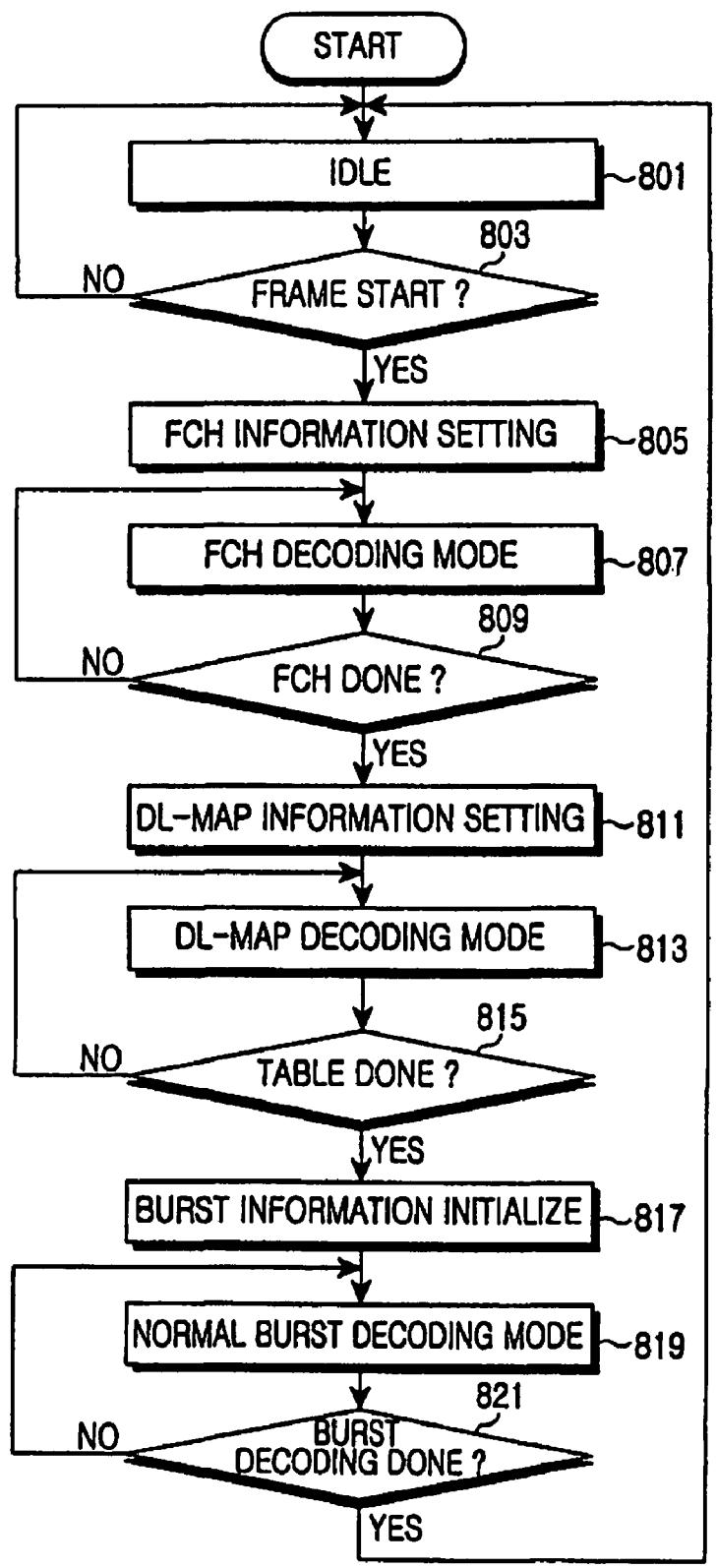
FIG. 8 illustrates a method for decoding FCH and DL-MAP without HARQ MAP in a symbol scheduler according to the first embodiment of the present invention.

FIG. 8 illustrates a method for decoding FCH and DL-MAP without HARQ MAP in a symbol scheduler according to the first embodiment of the present invention.

Referring to FIG. 8, in step 801, the symbol scheduler 301 waits for the start of a new frame in an 'IDLE' state. That is, if a reset occurs due to the completion of the processing on a particular frame, the symbol scheduler 301 waits in an 'IDLE mode'. The waiting in the IDLE mode continues until a 'frame start' signal occurs in step 803.

If the 'frame start' signal is generated in step 803, the symbol scheduler 301 proceeds to step 805 where it sets FCH information (FCH information setting). That is, in step 805, the symbol scheduler 301 sets the information for FCH decoding. For example, the FCH is input to a PUSC region within 4 slots with 4 repetitions, and in this way, the symbol scheduler 301 sets the FCH size and repetition information in each of the blocks in the Rx data processing unit.

Thereafter, in step 807, the symbol scheduler 301 controls each of the blocks to perform FCH decoding in an FCH decoding mode,. The FCH decoding, as shown in step 809, continues until the symbol scheduler 301 receives an 'FCH Done' signal indicating completion of the FCH decoding. Upon receipt of the 'FCH Done' signal from the MAP decoder 315 in step 809, the symbol scheduler 301 proceeds to step 811 where it sets DL-MAP information (DL-MAP information setting). In step 811, the symbol scheduler 301 sets the information for DL-MAP decoding. In other words, if the FCH decoding is done in step 807, the symbol scheduler 301 can acquire such information as DL-MAP size, repetition, code, etc., and the symbol scheduler 301 sets this information in each of the blocks in the Rx data processing unit.

Thereafter, in step 813, the symbol scheduler 301 controls each of the blocks in the Rx data processing unit to perform DL-MAP decoding in a DL-MAP decoding mode. Here, a table is generated by the MAP decoder 315 as a result of the DL-MAP decoding, and in this process, the symbol scheduler 301 waits, as shown in step 815, in the DL-MAP decoding mode until a 'TABLE Done' signal indicating completion of the table generation is generated.

Upon receipt of the 'TABLE Done' signal in step 815, the symbol scheduler 301 proceeds to step 817 where it sets burst information to an initial value (Burst information initialize). In step 815, the symbol scheduler 301 sets the information for normal burst decoding. Such related information can be read from the burst table. In this case, the symbol scheduler 301 reads the information from the burst table, and sets code rate and FEC code type in the LLR demapper 307, CTC repetition in the decoder 309, and burst size information in the memory 313 which is a burst memory.

Thereafter, in step 819, the symbol scheduler 301 controls each of the blocks in the Rx data processing unit to decode the normal bursts in a normal burst decoding mode. The symbol scheduler 301, as shown in step 821, waits in the normal burst decoding mode until a 'Burst decoding Done' signal indicating completion of the burst decoding is received from the decoder 309. Finally, upon receipt of the 'Burst decoding Done' signal from the decoder 309 in step 821, the symbol scheduler 301 ends the frame processing and then returns to step 801 in response to, for example, a reset, and waits for the start of a new frame.

A description has been made of the processing process in the symbol scheduler 301 according to the first embodiment of the present invention. A description will now be made of a detailed processing process for each of sub-schedulers of the symbol scheduler 301, i.e. the FCH scheduler 410, the DL-MAP scheduler 420, the initiation scheduler 430, and the normal scheduler 440.

First, a detailed operation process for the FCH scheduler 410 will be described below.

The FCH scheduler 410 manages a related state for performing FCH decoding. That is, the FCH scheduler 410 operates when the scheduler state is 'FCH mode'. More specifically, the FCH scheduler 410 checks a predetermined buffer, or a channel estimator buffer, to determine if data has been sufficiently channel-estimated so that that data can undergo FCH decoding. Because the FCH is disposed herein in a first PUSC symbol interval, the FCH scheduler 410 checks if channel estimation on the first two symbols is completed. Upon detecting the completion of the channel estimation, the FCH scheduler 410 sets information necessary for FCH decoding. That is, the FCH scheduler 410 sets repetition, burst ID, data size, FEC code type, and the like. After the setting is completed, the FCH scheduler 410 generates an address used for reading data from the channel estimator buffer, and then waits until an 'FCH decoding Done' signal is generated.

Next, a detailed operation process for the DL-MAP scheduler 420 will be described below.

The DL-MAP scheduler 420 manages a state for the time that it performs DL-MAP decoding after the FCH decoding is completed by the FCH scheduler 410. Herein, the DL-MAP, unlike the FCH, is unfixed in its length and varies in the code rate according to circumstances. Therefore, the DL-MAP scheduler 420 should receive the FCH decoding result from the MAP decoder 315 and set the related information in the corresponding blocks (LLR demapper 307 and memory 313) of the Rx data processing unit. In the DL-MAP scheduler 420, the state is initialized and managed every frame. More specifically, the DL-MAP scheduler 420 starts its operation when the symbol scheduler 301 enters a DL-MAP mode. In the DL-MAP mode, the DL-MAP scheduler 420 first sets the information necessary for performing decoding in each of the necessary blocks. The necessary information includes DL-MAP size, DL-MAP repetition, code rate, etc., and the DL-MAP scheduler 420 sets the DL-MAP size in the burst memory 313, and the DL-MAP repetition and the code rate in the LLR demapper 307. After the setting is complete, the DL-MAP scheduler 420 reads a channel estimation value and data from a channel estimator buffer of the channel estimator 303. Thereafter, the DL-MAP scheduler 420 waits until a 'DL-MAP DONE' signal indicating the completion of the DL-MAP decoding is generated.

Next, a detailed operation process for the initiation scheduler 430 will be described below.

The initiation scheduler 430 sets the necessary information in the corresponding blocks, i.e. the LLR demapper 307, burst memory 313 and HARQ controller 317, each time the state changes in the symbol scheduler 301. By presetting the repeatedly used data before transmitting the data in this manner, it is possible to increase the entire data processing performance. The initiation scheduler 430 herein performs the following three FCH setting steps, and sets the information necessary in each region.

The initiation scheduler 430 sets FCH-related information before performing FCH decoding, after a new frame is received.

The initiation scheduler 430 sets DL-MAP information acquired from the FCH to perform DL-MAP decoding, after the FCH decoding is complete.

The initiation scheduler 430 sets information necessary for decoding the normal data based on configuration tables acquired as a result of the DL-MAP decoding.

Next, a detailed operation process for the normal scheduler 440 will be described below.

The normal scheduler 440 serves as a scheduler for normal burst decoding. Because the normal data can exist in the PUSC region and/or FUSC region, the normal scheduler 440 should take into account the details related to the normal data. The information is set separately for each individual burst based on the configuration tables.

The receiver of the broadband wireless communication system according to the first embodiment of the present invention cannot transfer a received burst to the decoder until one burst is fully input to the channel estimator 303. In addition, when more than two bursts are received, the receiver of the broadband wireless communication system performs decoding on the first received burst, and then performs decoding on the other burst, thereby causing a decoding delay.

The present invention provides a structure and method for processing data on a symbol-by-symbol basis in an Rx data processing unit, or a symbol level block, for processing data on a symbol-by-symbol basis according to a second embodiment of the present invention. A received data decoding part proposed in the second embodiment of the present invention is designed to support both HARQ data processing and normal data processing.

The 802.16e standard can support several data processing scheduling schemes according to its analysis. Therefore, the present invention provides an apparatus and method for processing data symbol by symbol to realize the highest possible (or full) data rate.

The second embodiment of the present invention provides a structure and HARQ burst processing method for processing normal data on a symbol-by-symbol basis, a structure and operation of a burst memory for processing normal data on a symbol-by-symbol basis, and a structure and operation of an HARQ controller. A description of the operation and structure of the blocks in the receiver of the broadband wireless communication system, described in the first embodiment, will be omitted herein for simplicity.

Before a description of the second embodiment of the present invention is given, processes of processing received bursts in a mobile station (or receiver) of the broadband wireless communication system according to the first embodiment of the present invention will be described with reference to FIGS. 9 to 11.

Figure 9:
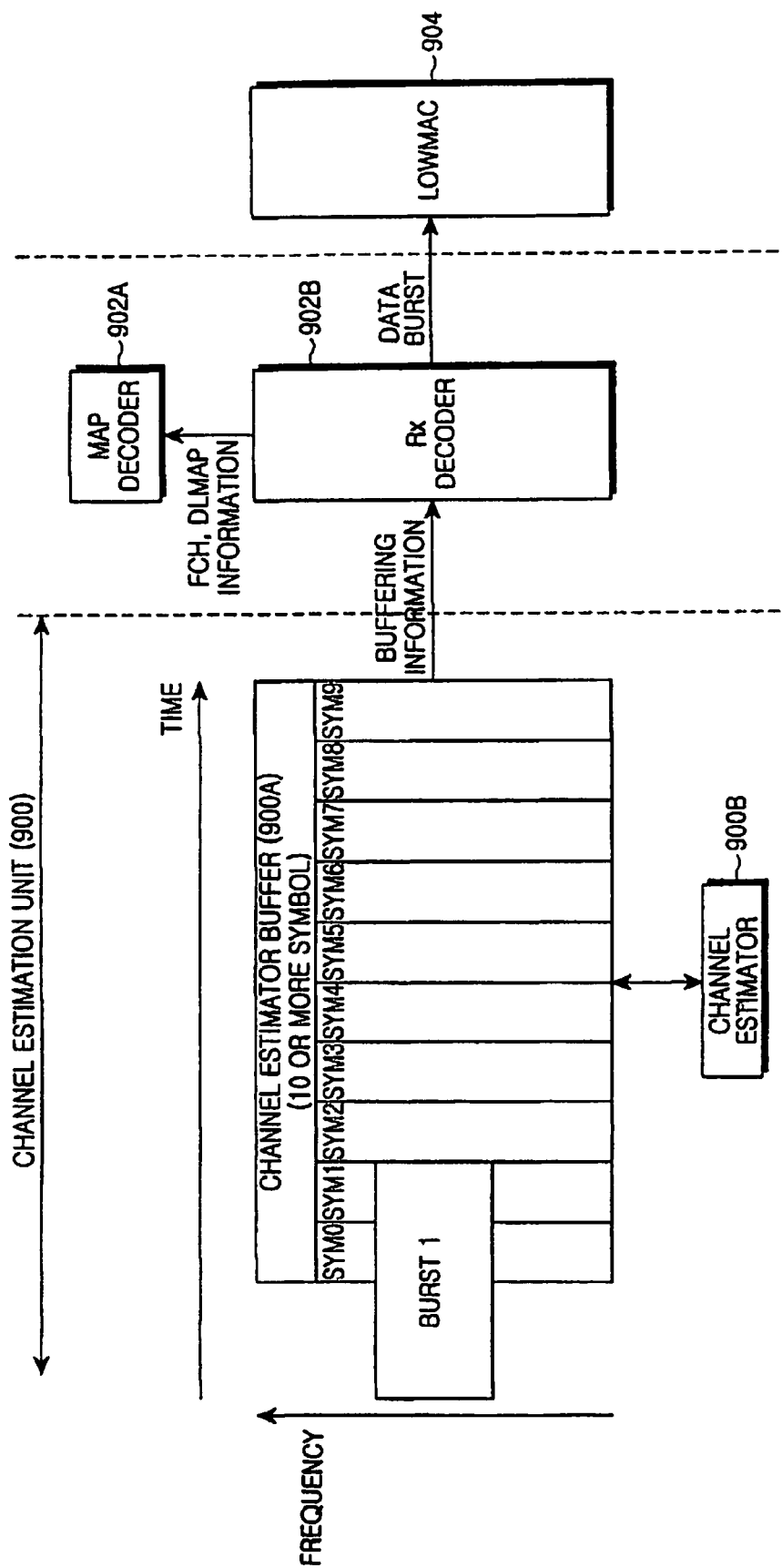
FIG. 9 is a block diagram given for a brief description of an operation performed when one burst is input to a channel estimation unit of a broadband wireless communication system's receiver according to the first embodiment of the present invention.
Figure 10:
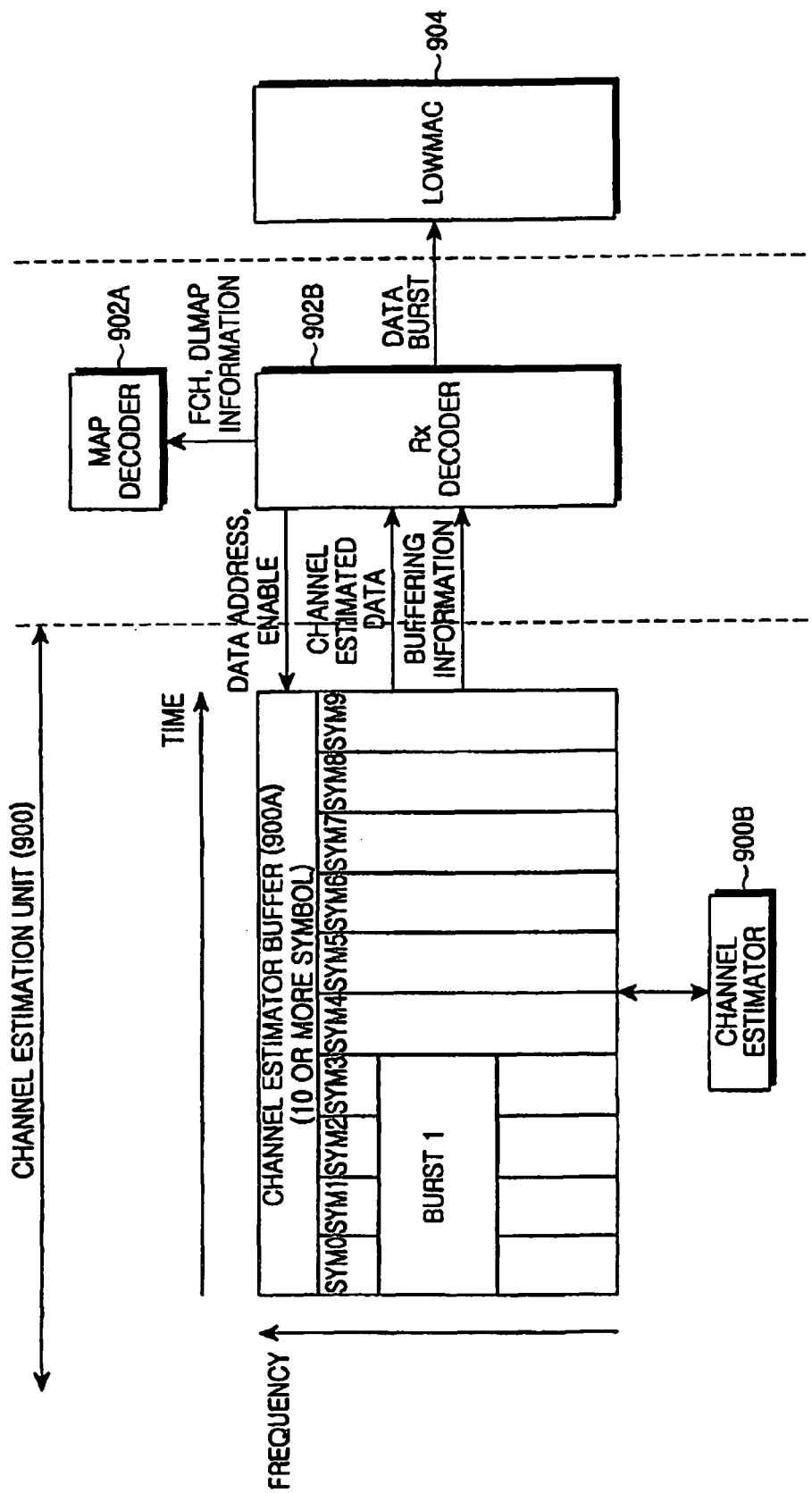
FIG. 10 is a block diagram given for a description of an operation performed when one burst is fully input to a channel estimation unit and then stored in a channel estimator buffer in a broadband wireless communication system's receiver according to the first embodiment of the present invention.

That is, a scheme of processing data on a burst-by-burst basis in the modem for a mobile station of the broadband wireless communication system according to the first embodiment of the present invention is shown in FIGS. 9 and 10.

FIG. 9 is a block diagram given for a brief description of an operation performed when one burst is input to a channel estimation unit 900 of a broadband wireless communication system receiver according to the first embodiment of the present invention. In FIG. 9, a burst being buffered in the channel estimation unit 900 is assumed to be a burst with burst ID=1. The burst ID means the 'Burst_indx' described in FIGS. 5 and 6. For convenience, the symbol scheduler 301, the LLR demapper 307, the decoder 309, the memory 313 and the HARQ controller 317 among the blocks of the Rx data processing unit, described in the first embodiment of the present invention, will be referred to as an Rx decoder 902B in FIGS. 9 to 11. In addition, the channel estimation unit 900 is divided into a channel estimator buffer 900A and a channel estimator 900B.

FIG. 10 is a block diagram given for a description of an operation performed when one burst is fully input to a channel estimation unit and then stored in a channel estimator buffer in a broadband wireless communication system receiver according to the first embodiment of the present invention.

The foregoing scheme of processing data on a burst-by-burst basis performs data decoding after one burst is completely channel-estimated in the channel estimator 900B and then stored in the channel estimator buffer 900A. Regarding the channel estimator buffer 900A, it is assumed that 10 symbols of a symbol #0 to a symbol #9 can be buffered therein. The vertical axis indicates frequency and the horizontal axis indicates time. A base station transmits data on a symbol-by-symbol basis at regular intervals. If the channel estimation unit 900 buffers the data received symbol by symbol, the Rx decoder 902B reads the data slot by slot from the channel estimator buffer 900A, and processes the read data. The mobile station of the broadband wireless communication system according to the first embodiment of the present invention waits without starting data decoding when the burst 1 is not fully buffered in the channel estimator buffer 900A as shown in FIG. 9. Thereafter, when the data is fully stored as shown in FIG. 10, the mobile station starts data burst decoding. After the decoding of one data burst is complete, the mobile station starts decoding the next burst. Based on the buffering information provided from the channel estimation unit 900, the Rx decoder 902B can determine how much burst data is now buffered in the channel estimator buffer 900A. The Rx decoder 902B can read channel estimated data, or the actually buffered burst data, by transferring to the channel estimation unit 900 a data address and an enable signal, which are signals used for reading the actually buffered burst data. That is, the decoding is not performed when a part of the burst is buffered as shown in FIG. 9, and the Rx decoder 902B can perform decoding on the received burst only when the full burst is buffered as shown in FIG. 10.

Figure 11:
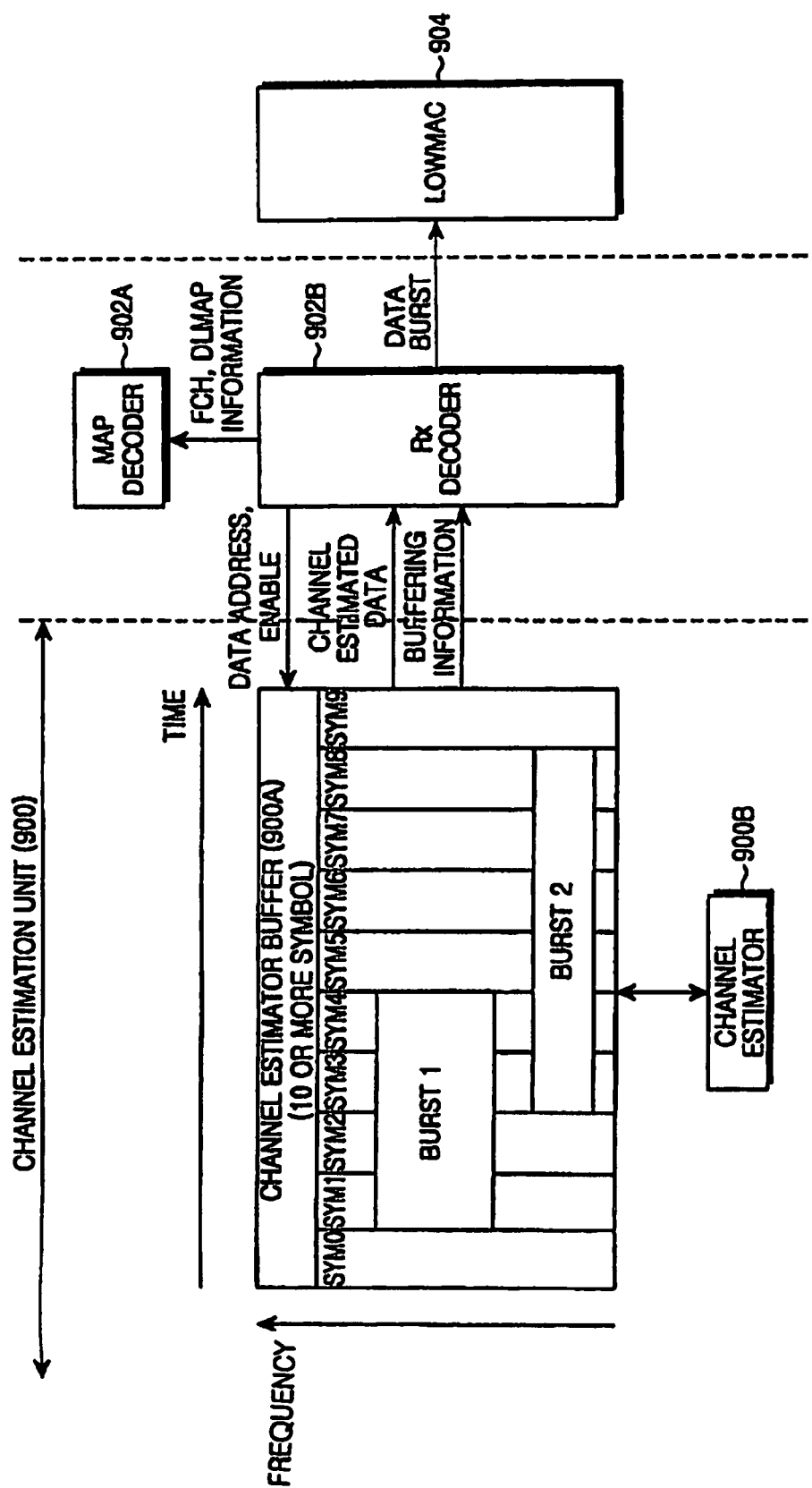
FIG. 11 illustrates an operation performed when two bursts are input to a channel estimation unit in a receiver of the broadband wireless communication system according to the first embodiment of the present invention.

In addition, when bursts 1 and 2 are simultaneously buffered in the channel estimator buffer 900A as shown in FIG. 11, it is seen that the Rx decoder 902B decodes the burst 2 after the burst 1 is fully buffered. That is, it is seen in FIG. 11 that two bursts with burst IDs (Burst_indx)='1' and '2' are buffered in the channel estimator buffer 900A.

Because the receiver of the broadband wireless communication system according to the first embodiment of the present invention processes data on a burst-by-burst basis, there is no need for a particular process in the course of performing decoding on the burst data. However, because the next burst buffered after one burst was completely channel-estimated cannot undergo decoding before the decoding on the currently processed burst is complete, the entire processing speed at which the receiver processes the received data decreases.

That is, the burst processing scheme in the mobile station of the broadband wireless communication system to which the present invention is applicable has the following problems.

1. Because the processing cannot proceed to the next burst before one burst is completely processed, there is a need for a high-capacity channel estimator buffer capable of buffering all received bursts.

2. Because data decoding cannot be performed until the entire channel estimation processing on one burst is complete, a processing speed for the received data decreases.

3. There is a need for a large number of decoders to increase the data processing speed.

4. Control for reading data in the channel estimator buffer increases in complexity.

The second embodiment provides a structure and processing method of an Rx data processing unit for efficiently processing received data in a mobile station's modem of the 802.16e-based broadband wireless communication system.

A brief description of the second embodiment of the present invention will be given below. The second embodiment of the present invention, described below, controls to perform decoding in units of symbols having a part of the burst, rather than in units of bursts, as the channel estimator buffer 900A receives data from a base station on a symbol-by-symbol basis as described in FIGS. 9 to 11, so there is no need to delay the decoding start until buffering and channel estimation on the burst is complete as described above.

Figure 12:
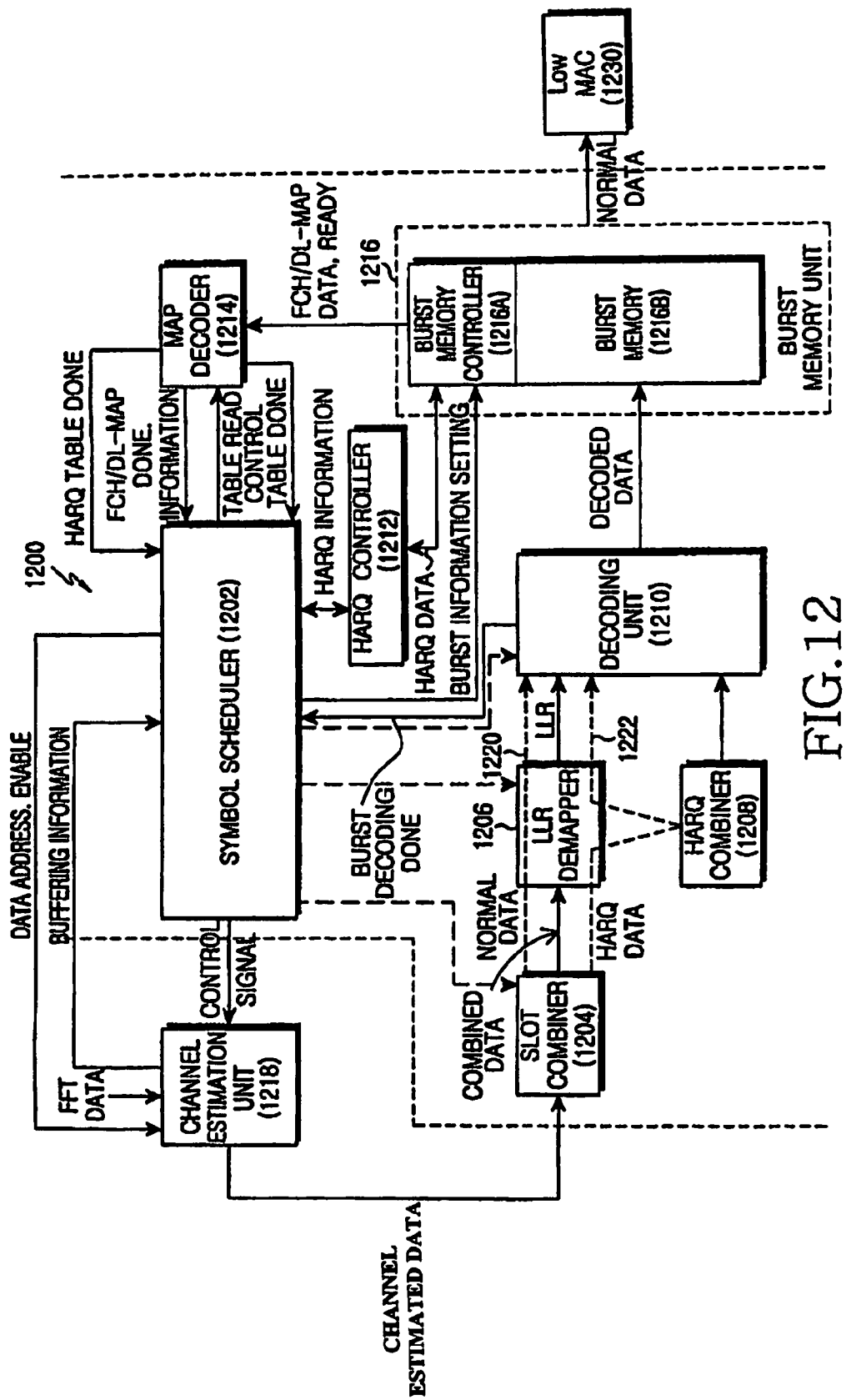
FIG. 12 is a block diagram illustrating a received data decoding part for decoding received data in a broadband wireless communication system according to a second embodiment of the present invention.

FIG. 12 is a block diagram illustrating a received data decoding part 1200 for decoding received data and its peripheral devices in a broadband wireless communication system according to the second embodiment of the present invention. FIG. 12 is a block diagram of an Rx data processing unit according to the second embodiment of the present invention. In the second embodiment of the present invention, it is assumed that a MAP decoder 1214, under the control of a symbol scheduler 1202, has completed the decoding on the FCH and DL-MAP as done in FIGS. 7 and 8 described in the first embodiment of the present invention. Therefore, the symbol scheduler 1202 can provide a channel estimation unit 1218 with information on the data positions of the buffered bursts.

Figure 13:
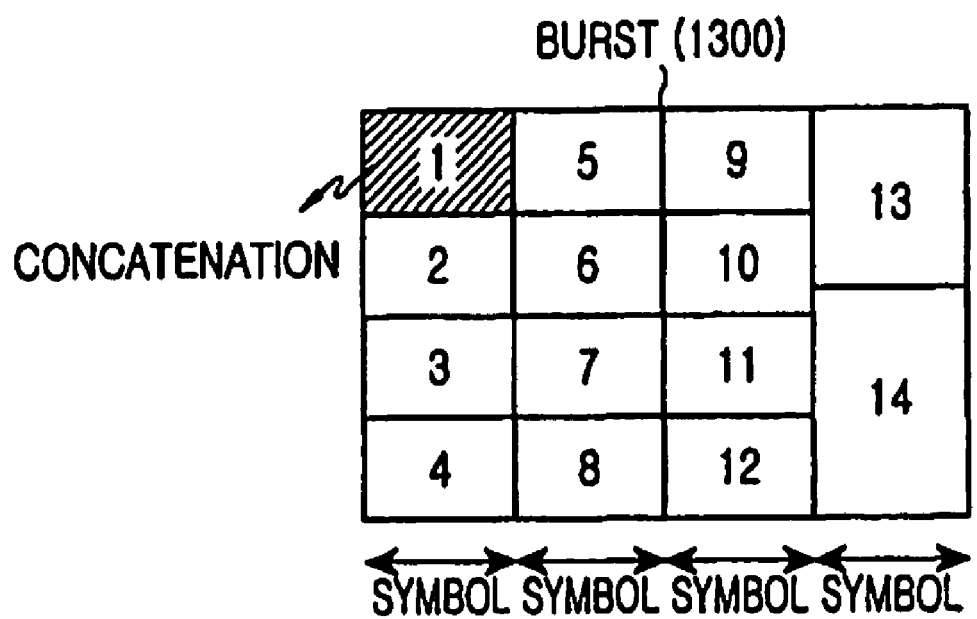
FIG. 13 illustrates a burst divided into concatenations, used in a broadband wireless communication system, according to the second embodiment of the present invention.

Upon receipt of bursts (FFT data), the channel estimation unit 1218 perform buffering on the received bursts on a symbol-by-symbol basis. In this case, the bursts are buffered in a channel estimator buffer of the channel estimation unit 1218 in the form shown in FIG. 13. FIG. 13 illustrates a burst divided into concatenations, used in a broadband wireless communication system, according to the second embodiment of the present invention.

A base station of the IEEE 802.16e-based broadband wireless communication system transmits data on a symbol-by-symbol basis, and divides the burst to be transmitted on a symbol-by-symbol basis into concatenations having a predetermined size.

For a better understanding of the present invention, one burst 1300 is divided into 14 concatenations in the example in FIG. 13. The 14 concatenations are assigned identifiers (ID) of 1 to 14. In the second embodiment of the present invention, each of the 14 concatenations will be referred to as a 'data concatenation', and the identifiers 1 to 14 of the data concatenations will be referred to as 'burst partial IDs'. The term 'concatenation' used in the second embodiment of the present invention is defined in Section 8.4.9 of IEEE 802.16e (Wibro) standard document. In the IEEE 802.16e standard document, it is disclosed that the base station determines the size and number of data concatenations according to burst sizes of the bursts constituting a transmission frame and a modulation scheme such as Quadrature Phase Shift Keying (QPSK) and Quadrature Amplitude Modulation (QAM).

In a transmitter of the IEEE 802.16e-based Wibro system, 48 subcarriers constitute one slot, and several slots constitute one data concatenation. The transmitter repeats the data concatenation slot by slot for transmission. Therefore, in the second embodiment of the present invention, a channel estimation unit in a receiver of the Wibro system buffers data on a symbol-by-symbol basis, and the received data decoding part 1200 reads the buffered data on a slot-by-slot basis. If the slot-based data becomes a concatenation unit, the receiver performs decoding concatenation by concatenation.

Although the second embodiment of the present invention will be described herein with reference to the Wibro system, the present invention can be applied not only to the Wibro system, but also to all broadband wireless communication systems that divide the burst into symbols having a predetermined size, like the Wibro system.

Shown in FIG. 12 is an Rx data processing unit included in a modem for a receiver used in a Wibro system according to the second embodiment of the present invention. The Rx data processing unit includes the channel estimation unit 1218 and the received data decoding part 1200.

In FIG. 12, if the channel estimation unit 1218 for processing data in a front stage of the received data decoding part 1200 buffers received slot-based data in its channel estimator buffer after completing channel estimation, the symbol scheduler 1202 of the received data decoding part 1200 sends the channel estimation unit 1218 a control signal used for reading the channel estimator buffer in the channel estimation unit 1218.

At this moment, because the decoding on the FCH and DL-MAP has already been done, the symbol scheduler 1202 has burst information such as position and size information of the bursts buffered in the channel estimator buffer. Therefore, in the second embodiment of the present invention, when the buffered bursts are output from the channel estimator buffer in the channel estimation unit 1218 to the slot combiner 1204 on a slot-by-slot basis, the symbol scheduler 1202 forwards even the information on IDs of the buffered bursts and burst partial IDs to the slot combiner 1204. In the second embodiment of the present invention, the symbol scheduler 1202 performs the overall control on the internal blocks of the received data decoding part 1200. In addition, the symbol scheduler 1202 extracts burst sizes of the bursts constituting the frame and modulation scheme information applied to the frame, from the control information (DL-MAP, FCH) for the data of one frame composed of multiple bursts, assigns burst IDs used for identifying the bursts, and assigns burst partial IDs to the data concatenations having a concatenation size according to the burst sizes and the modulation scheme information.

Further, the slot combiner 1204 combines the data repeated on a slot-by-slot basis, output from the channel estimation unit 1218, and outputs the combined data to an LLR demapper 1206. In addition, the slot combiner 1204 outputs the combined data, and the burst IDs and burst partial IDs associated with the combined data.

The slot combiner 1204 is a block for combining slot-based repetitions when data is repeated on a slot-by-slot basis during its transmission (slot-based repetition is performed in units of 1, 2, 4 and 6 in the Wibro standard).

In the second embodiment of the present invention, the slot combiner 1204 combines input data, and transfers the combined data to the LLR demapper 1206. The LLR demapper 1206 converts the data combined by the slot combiner 1204 into an LLR, and the LLR is forwarded to a decoding unit 1210. Further, the slot combiner 1204 transfers the combined data, and the burst IDs and burst partial IDs of the combined data as well, to the decoding unit 1210 via the LLR demapper 1206.

When the data output from the slot combiner 1204 is HARQ data, the LLR demapper 1206 transfers the HARQ data to an HARQ combiner 1208, and the HARQ combiner 1208 combines the old HARQ data with new HARQ data. In FIG. 12, a dotted line 1220 between the slot combiner 1204 and the decoding unit 1210 indicates a transfer path of normal data other than HARQ data, and a dotted line 1222 indicates a transfer path of the HARQ data. The HARQ combiner 1208 can determine whether to perform combining on the received HARQ data depending on an HARQ indicator received from the symbol scheduler 1202.

That is, the slot combiner 1204 outputs the data combined after being repeated on a slot-by-slot basis, to the LLR demapper 1206, and the LLR demapper 1206 stores the combined data until it reaches one-data concatenation size. If the combined data reaches one-data concatenation size, the LLR demapper 1206 outputs the combined data to the decoding unit 1210.

For example, if one data concatenation is composed of 3 slots and is repeated two times (repetition=2), the slot combiner 1204 reads 6 slots from the channel estimation unit 1218, performs repetition=3 combining thereon, and outputs the combined data to the LLR demapper 1206, and if the combined data is a 3-slot size, the LLR demapper 1206 outputs the combined data to the decoding unit 1210.

The decoding unit 1210 decodes the LLR value output from the LLR demapper 1206 to restore it to the original data concatenation, and transfers the restored data concatenation, and the burst IDs and burst partial IDs of the restored data concatenation to a burst memory unit 1216, and the burst memory unit 1216 stores the received data concatenations in its memory in the original order of the data concatenations generated in the transmitter. The decoding unit 1210 performs decoding in units of data concatenations. That is, the decoding unit 1210 divides received one-slot data included in the frame into data concatenations according to the concatenation sizes, and decodes the data concatenations. The decoding unit 1210 herein can include CTC and CC decoders. Although only one decoder is shown in FIG. 12, the receiver can include a plurality of decoders according to the rate necessary for data processing. In the second embodiment of the present invention, because data is processed on a symbol-by-symbol basis, the data bursts are delivered to the burst memory unit 1216 in the form that several data bursts are allocated to a symbol. When the normal data other than the HARQ data is received from the decoding unit 1210, the burst memory unit 1216 transfers the normal data to a low MAC 1230 to transmit the normal data to an upper layer.

The processing speed of the decoding unit 1210 varies because of the difference in size of the data concatenations of the burst, so the order in which the decoded data is transferred to the burst memory unit 1216 is also irregular. Therefore, the burst memory unit 1216 reorders the irregular data in the original burst data order, and then stores reordered burst data.

The burst memory unit 1216 according to the second embodiment of the present invention is composed of a burst memory controller 1216A and a burst memory 1216B, and stores the data in the burst memory 1216B. Control such as an access to the burst memory 1216B is performed by the burst memory controller 1216A. A detailed description of the burst memory controller 1216A and the burst memory 1216B will be made below with reference to FIGS. 16 and 17.

When the input data decoded by the decoding unit 1210 is HARQ data, the burst memory unit 1216 transfers the data to an HARQ controller 1212 so that it performs HARQ data processing.

The HARQ controller 1212 performs processing on the HARQ data, and determines whether to perform combining on the HARQ data read from the burst memory unit 1216, to simply store it, or to disregard the currently received HARQ data, based on HARQ information received from the symbol scheduler 1202. Depending on the decision, the HARQ controller 1212 controls an operation of the HARQ combiner 1208. The HARQ controller 1212 performs Cyclic Redundancy Check (CRC) on the HARQ data read from the burst memory unit 1216, and sends a resulting ACKnowledgement/Non-ACKnowledgement (ACK/NACK) to the symbol scheduler 1202. In FIG. 12, HARQ information between the symbol scheduler 1202 and the HARQ controller 1212 includes information (burst size information, etc.) set by the symbol scheduler 1202 to allow the HARQ controller 1212 to perform CRC check, ACK or NACK generated as a result of the CRC check, and information indicating whether to perform retransmission or combining. The second embodiment of the present invention provides a process for processing data on a symbol-by-symbol basis in the symbol scheduler 1202 among the block elements of the received data decoding part 1200, a structure including the HARQ combiner 1208 and the HARQ controller 1212, and a structure and operation of the memory unit 1216.

When the channel estimation on one symbol is complete, the channel estimation unit 1218 stores the processed value in its channel estimator buffer, and sends a signal indicating the completion of one-symbol processing to the symbol scheduler 1202 of the received data decoding part 1200.

When the one-symbol channel estimation is complete, the received data decoding part 1200 starts its operation, and the entire operation is controlled by the symbol scheduler 1202.

The symbol scheduler 1202, as described in FIG. 4, can be roughly divided into an FCH scheduler, a DL-MAP scheduler, an initiation scheduler, and a normal scheduler.

For the FCH and DL-MAP, data allocation is achieved in a one-dimensional manner. Therefore, in the second embodiment of the present invention, the decoding scheme will not be described. When the DL-MAP decoding is complete, the MAP decoder 1214, as described above, determines how the data allocation configuration is given in all received symbols, and configures a bitmap according to the determination result.

When the bitmap configuring is complete, the symbol scheduler 1202 controls to decode the data.

Figure 14:
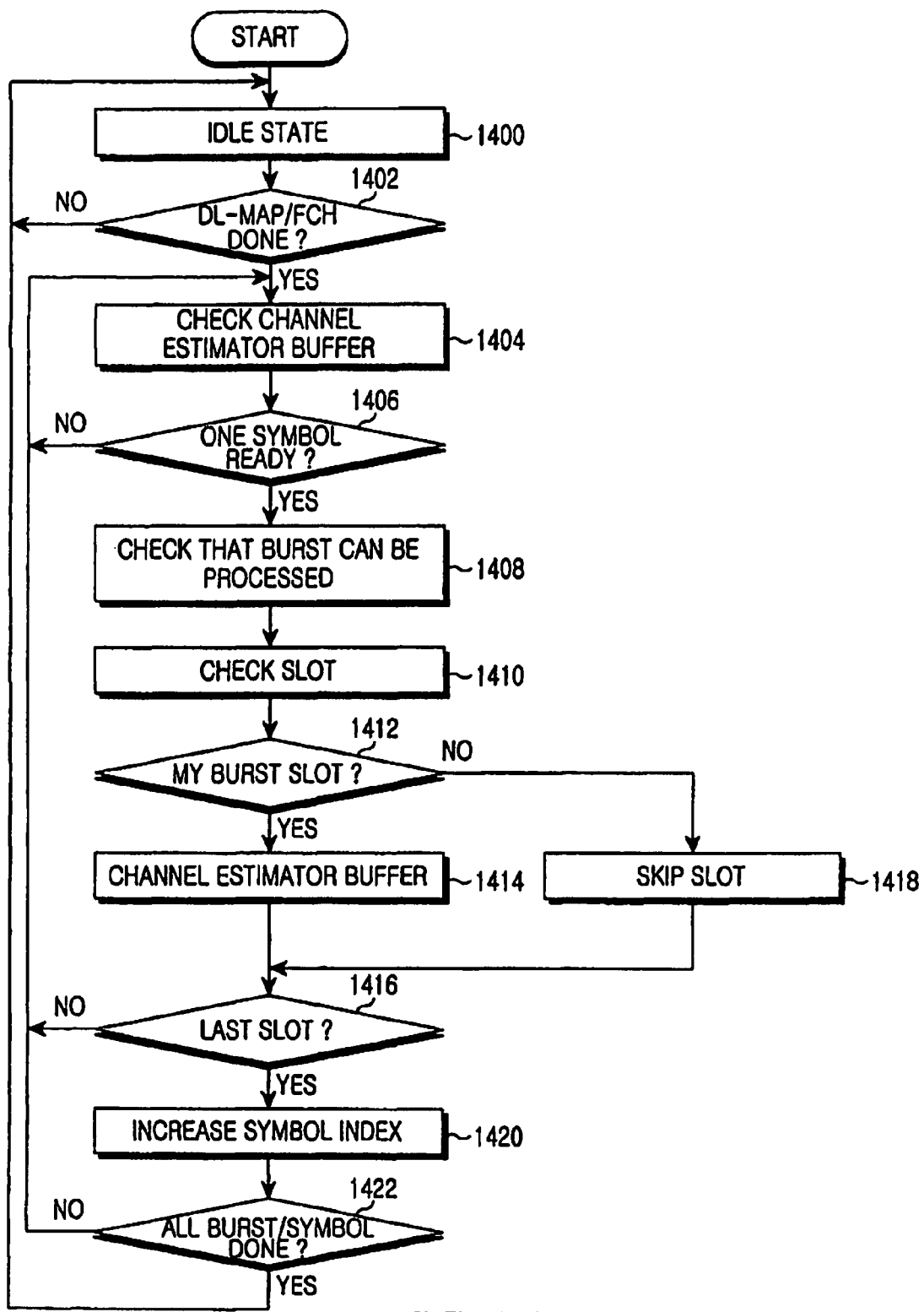
FIG. 14 is a flowchart for decoding data by a symbol scheduler according to the second embodiment of the present invention.

A flowchart of the symbol scheduler 1202 for data control according to the second embodiment of the present invention is shown in FIG. 14.

FIG. 14 is a flowchart for decoding data by a symbol scheduler 1202 according to the second embodiment of the present invention. The flowchart of FIG. 14 is performed by the normal scheduler described in FIG. 3.

The symbol scheduler 1202, operating in an IDLE state in step 1400, determines in step 1402 whether DL-MAP/FCH decoding is done in a MAP decoder 1214.

If the DL-MAP/FCH decoding is done in step 1402, the symbol scheduler 1202 controls each of the blocks in a received data decoding part 1200 according to a generated bitmap.

In step 1404, the symbol scheduler 1202 determines if there is at least one data concatenation buffered in a channel estimator buffer in a channel estimation unit 1218.

Upon receipt of a signal indicating the completion of channel estimation on one symbol from the channel estimation unit 1218 in step 1406, the symbol scheduler 1202 performs a control operation on the received data decoding part 1200.

If there is at least one buffered data concatenation in one symbol in step 1406, the symbol scheduler 1202 proceeds to step 1408 where it determines if a decoding unit 1210 can process the data. That is, in step 1408, the symbol scheduler 1202 determines if the decoding unit 1210 is available.

The decoding unit 1210 cannot process the data in the following cases.

1. The decoding unit 1210 cannot process the next data if all of the available decoders are in operation.

2. The decoding unit 1210 cannot read data from a burst memory unit 1216 even though its all decoders have completed their processing. For example, the decoding unit 1210 is transferring data to its following block, or is reading data from a different-type decoder (CTC decoder or CC decoder).

If any one of the above two conditions is satisfied, the decoding unit 1210 waits until the condition is released. If the condition is released, the symbol scheduler 1202 proceeds to step 1410.

If it is determined in step 1408 that the decoding unit 1210 can now process data, the symbol scheduler 1202 checks in step 1410 one slot in the corresponding symbol to determine if there is data in the slot.

However, if it is determined in step 1406 that there is no data concatenation buffered in the channel estimator buffer of the estimation unit 1218, the symbol scheduler 1202 returns to step 1404 where it checks the channel estimator buffer.

According to the IEEE 802.16e standard, because data is allocated on a slot-by-slot basis, data processing should also be performed on a slot-by-slot basis. Therefore, if it is determined in step 1410 that there is at least one data concatenation in the slot, the symbol scheduler 1202 checks the bitmap in step 1412. If the data to be processed in the corresponding slot is data corresponding to the receiver, i.e. is data that the symbol scheduler 1202 should process, the symbol scheduler 1202 proceeds to step 1414 where it reads a data concatenation of the corresponding slot and processes the received data. Otherwise, the symbol scheduler 1202 proceeds to step 1418 where it skips the slot.

In step 1414, the symbol scheduler 1202 sets information necessary for performing slot-combining and LLR demapping on the corresponding slot. To allow the burst memory unit 1216 to reorder data, the symbol scheduler 1202 generates burst IDs and burst partial IDs, and outputs them to the burst memory unit 1216. The method in which the burst memory unit 1216 reorders data concatenations using the burst IDs and burst partial IDs received from the symbol scheduler 1202 will be described in detail with reference to FIGS. 16 and 17.

If the data processing is completed in step 1414, the symbol scheduler 1202 reads data concatenations for one slot from the channel estimator buffer of the channel estimation unit 1218. If the read operation is complete for one slot in step 1414, the symbol scheduler 1202 proceeds to step 1416 where it determines if the slot read now is the last slot in the corresponding symbol. If the read slot is the last slot, the symbol scheduler 1202 proceeds to step 1420 where it takes an action to read the next symbol. The symbol scheduler 1202 performs an operation of increasing the symbol index to check the next symbol of the already checked symbol among the symbols buffered in the channel estimator buffer. However, if the read slot is not the last slot in step 1416, the symbol scheduler 1202 returns to step 1404 where it determines if there is a new data concatenation input to the channel estimation unit 1218.

In step 1422, the symbol scheduler 1202 determines whether the processing on all symbols or all allocated data bursts is complete. If it is determined that the processing on all symbols or all bursts is not complete, the symbol scheduler 1202 returns to step 1404 where it determines if there is a data concatenation input to the channel estimator buffer of the channel estimation unit 1218. However, if it is determined in step 1422 that the processing on the bursts/symbols of the frame corresponding to the DL-MAP and FCH decoded in step 1402 is complete, the symbol scheduler 1202 returns to step 1400.

The data output from the channel estimator buffer in the channel estimation unit 1218 under the control of the symbol scheduler 1202 as described in FIG. 14, is input to a slot combiner 1204.

If the data repeated on the slot-by-slot basis is combined by the slot combiner 1204, the decoding unit 1210 can perform data decoding using an LLR output from the LLR demapper 1206. To increase the data processing speed, a plurality of the decoding units 1210 can be provided. The slot combiner 1204 outputs the slot-based data concatenations output from the channel estimation unit 1218, and the burst IDs and burst partial IDs.

Because the outputs from the multiple decoders included in the decoding unit 1210 are irregularly output according to the sizes of the data bursts and data concatenations, there is a need for a method of reordering the decoded burst concatenations in order and generating the original data burst.

The burst memory unit 1216 is a block for combining the outputs of the decoding unit 1210 and reordering them into the data bursts originally generated in the transmitter. With reference to FIG. 12, a description will now be made of an operation flow of the burst memory controller 1216A in the burst memory unit 1216 according to the second embodiment of the present invention.

As shown in FIG. 12, the burst memory unit 1216, connected to the output of the decoding unit 1210, reorders the data concatenations output from the decoding unit 1210. To reorder the data input to the burst memory 1216B, the burst memory controller 1216A of the burst memory unit 1216 needs the following 3 types of information.

a. size of data bursts (burst size)
b. data number (burst ID)
c. sequence information of data burst concatenations (burst partial ID)

The data burst size information, burst ID and burst partial ID are included in the burst information delivered from the symbol scheduler 1202 to the burst memory unit 1216 in FIG. 12. That is, depending on the burst information setting signal, the symbol scheduler 1202 designates burst regions in the burst memory unit 1216.

Figure 15:
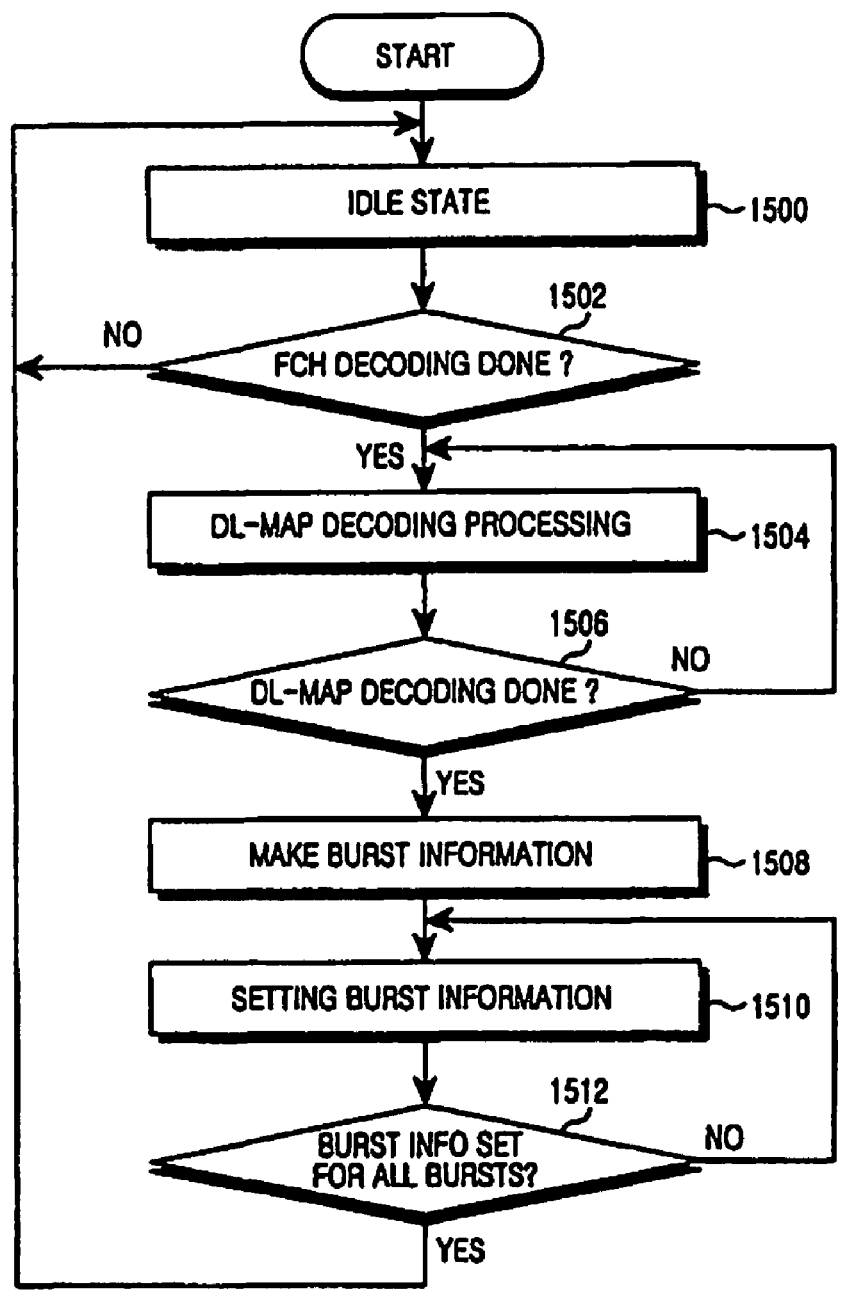
FIG. 15 is a flowchart for setting burst information by a symbol scheduler according to the second embodiment of the present invention.

A process of setting the burst information by the symbol scheduler 1202 is as shown in FIG. 15.

FIG. 15 is a flowchart for setting burst information by a symbol scheduler 1202 according to the second embodiment of the present invention. The flowchart of FIG. 15 is performed by the initiation scheduler described in FIG. 3.

Referring to FIG. 15, the symbol scheduler 1202, operating in an IDLE state in step 1500, proceeds to step 1502 where it determines if FCH decoding is complete. If it is determined in step 1502 that the FCH decoding is done, the symbol scheduler 1202 can check the DL-MAP size. In step 1504, the symbol scheduler 1202 performs DL-MAP decoding using the DL-MAP size. The symbol scheduler 1202 determines in step 1506 if DL-MAP decoding is complete. By performing the DL-MAP decoding, the symbol scheduler 1202 can acquire size information for each burst, and generates in step 1508 burst information using the acquired size information. The burst information includes burst size, burst ID and burst partial ID. The symbol scheduler 1202 according to the second embodiment of the present invention extracts burst sizes of the bursts constituting the frame and modulation scheme information applied to the frame, from the control information for the data of one frame composed of multiple bursts, assigns burst IDs used for identifying the bursts in the received order, and assigns burst partial IDs to the data concatenations having concatenation sizes according to the burst sizes and the modulation scheme information.

Therefore, the symbol scheduler 1202 transfers in step 1510 the acquired burst size information to the burst memory unit 1216, to allow the burst memory controller 1216A of the burst memory unit 1216 to allocate as many burst regions as the burst size corresponding to the burst IDs, in the burst memory 1216B. The symbol scheduler 1202 proceeds to step 1512 where it determines if burst information is set for all bursts. If the burst information is not set for all bursts, the symbol scheduler 1202 returns to step 1510 where it sets burst information for the remaining bursts. However, if burst information for all bursts buffered in the channel estimator buffer is generated in step 1512, the symbol scheduler 1202 transitions to the IDLE state of step 1500. The symbol scheduler 1202 sets the burst information every frame.

The burst memory unit 1216 is realized in the size capable of storing the maximum-size data that the received data decoding part 1200 can process. Generally, the burst memory 1216B of the burst memory unit 1216 is composed of one memory, and it does not need a function capable of reordering the data because the burst memory 1216B receives the data from several decoders included in the decoding unit 1210 and the data concatenations output from the decoding unit 1210 are not input in their transmission order from the transmitter.

Figure 16:
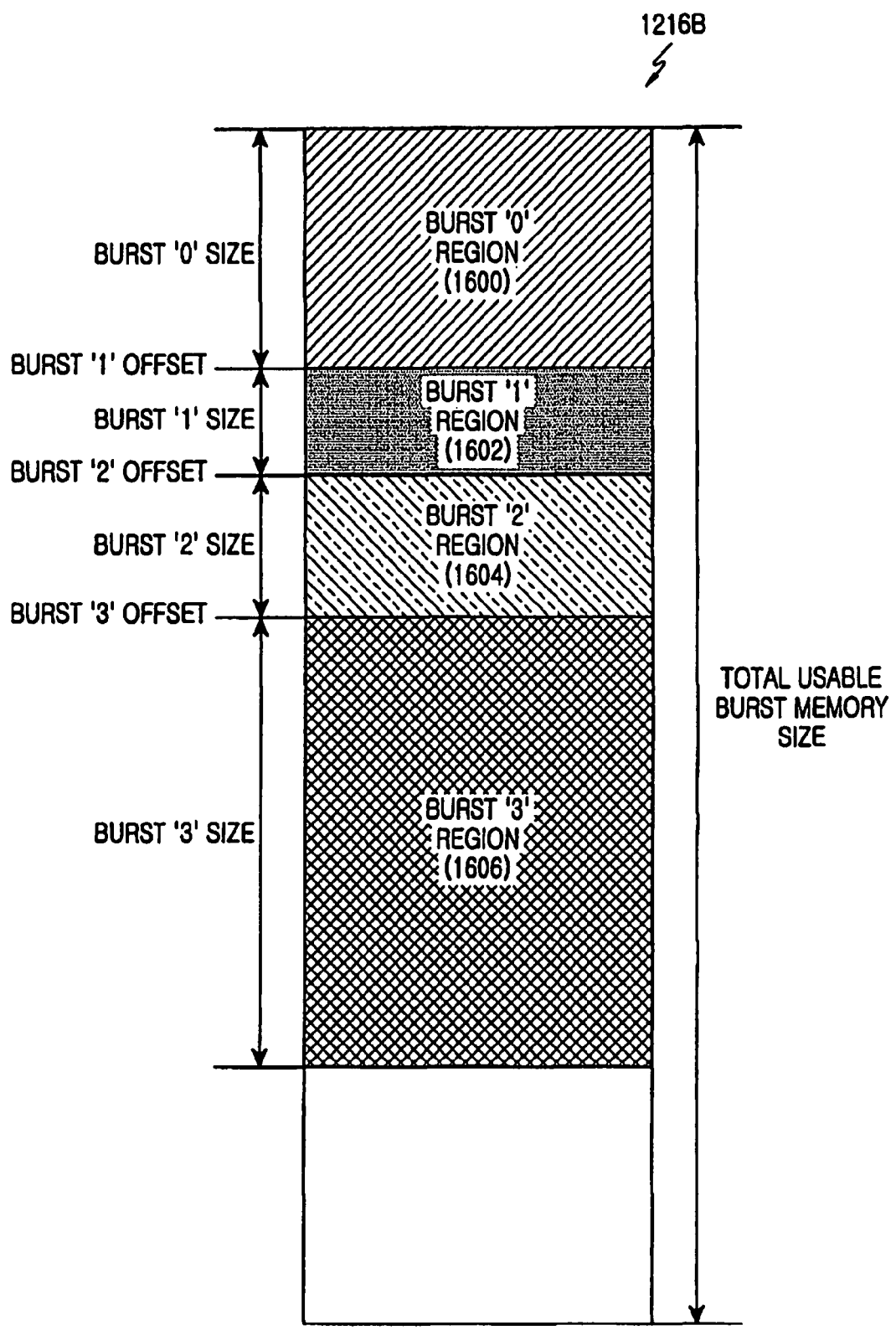
FIG. 16 illustrates a structure of a burst memory according to the second embodiment of the present invention.

Therefore, to store the data concatenations output from the decoding unit 1210 in the burst memory 1216B, the burst memory controller 1216A should receive as much position information on the memory as the size of each burst, and set as many regions as the burst size corresponding to the burst ID in the burst memory 1216B in the form shown in FIG. 16. That is, the burst memory controller 1216A according to the second embodiment of the present invention forms, in burst memory 1216B, burst regions for storing the data concatenations according to the burst identifiers, and sequentially stores the decoded data concatenations in the burst memory 1216B according to the burst identifiers and burst partial identifiers corresponding to the data concatenations decoded in the decoding unit 1210.

FIG. 16 illustrates a structure of a burst memory 1216B according to the second embodiment of the present invention.

In the structure of FIG. 16 according to the second embodiment of the present invention, an offset for the bursts is set based on the burst information received at one burst memory 1216B from the symbol scheduler 1202. The set offset becomes a store/read position of the data burst to be stored in the burst memory 1216B. Referring to FIG. 16, bursts 0, 1, 2 and 3 are stored in a burst-0 region 1600, a burst-1 region 1602, a burst-2 region 1604, and a burst-3 region 1606, respectively.

The burst memory 1216B receives data bursts from the decoding unit 1210 and stores the received data bursts, in the following order.

a. The decoding unit 1210 sends a 'Decoding Done' signal indicating completion of the decoding to the symbol scheduler 1202, and also sends, to the burst memory unit 1216, burst IDs of the bursts including the decoded data concatenations and burst partial IDs associated with the data concatenations.

b. After receiving the 'Decoding Done' signal, the burst IDs and the burst partial IDs, the burst memory controller 1216A of the burst memory unit 1216 checks the burst IDs output from the decoding unit 1210, and searches for burst partial IDs associated with the burst IDs.

The burst memory controller 1216A of the burst memory unit 1216 compares the burst partial ID associated with the data concatenation output from the decoding unit 1210 with the burst partial ID to be stored in the burst memory 1216B, and stores the data concatenation associated with the identical burst partial ID in the burst memory 1216B. That is, because the burst memory controller 1216a has information on the burst IDs and burst partial IDs of the data concatenations already stored in the burst memory 1216B, the burst memory controller 1216A compares a burst partial ID of the next data concatenation, following the burst partial ID of the already stored data concatenation, with the burst partial IDs of the data concatenations output from the decoding unit 1210, and stores the data concatenation associated with the identical burst partial ID in the burst memory 1216B.

If there is no data concatenation stored in the burst memory 1216B, the burst memory controller 1216A will store the first-position data concatenation with burst partial ID='1' among the data concatenations constituting the burst.

The reason why the burst memory controller 1216A compares the burst partial ID in this manner is, because a data concatenation associated with a burst partial ID of a particular burst ID is presently stored in the burst memory 1216B, to store only the data concatenations having the burst partial IDs following the burst partial ID of the corresponding data concatenation. Therefore, the burst memory controller 1216A compares the burst partial IDs of the data concatenations to be stored, with the burst partial IDs of the decoded data concatenations output from the decoding unit 1210.

Therefore, if the burst partial ID of the burst ID received from the decoding unit 1210 is equal to the burst partial ID having the already stored identical burst ID, the burst memory controller 1216A receives the data. Otherwise, if a different value is input, the burst memory controller 1216A does not receive the data, considering that decoding of the data was disordered because of the difference in length of the data concatenations received at the decoding unit 1210 from the LLR demapper 1206. The burst memory controller 1216A checks outputs of the other decoders in the decoding unit 1210, and finds a data concatenation associated with the next burst partial ID of the already stored burst partial ID.

c. The burst memory controller 1216A checks burst IDs of the data concatenations output from the decoding unit 1210 to form burst regions corresponding to the burst IDs in the burst memory 1216B, and checks burst partial IDs of the data concatenations to sequentially store the data concatenations in the corresponding burst regions. If a data concatenation having the same burst partial ID as the next burst partial ID of the burst partial ID of the burst ID associated with the data concatenation already stored in the burst memory 1216B is transferred from the decoding unit 1210, the burst memory controller 1216A stores the data concatenation output from the decoding unit 1210 in the burst memory 1216B taking into account a memory offset corresponding to the region of the corresponding burst ID.

An initial value of the memory offset is designated by the symbol scheduler 1202. Each time the data concatenation is stored in the burst memory 1216B, an address of the burst memory 1216B increases by the size of the stored data concatenation. The burst memory controller 1216A separately manages memory offsets according to burst IDs, and if the data concatenation is stored, the burst memory controller 1216A increases, by one, a burst partial ID counter value for indicating how many data concatenations with the corresponding burst ID are stored.

d. When Store Request signals are simultaneously generated in several decoders in the decoding unit 1210, the burst memory controller 1216A selects data concatenations that should be sequentially stored in the burst memory 1216B using the burst IDs and burst partial IDs, from among the store-requested data concatenations. For the time when the data output from one decoder is selected and stored by the burst memory controller 1216A, the remaining decoders of the decoding unit 1210 are in a wait state without outputting the decoded data. The burst memory controller 1216A selects the data to be stored from among the decoded data output from the decoders of the decoding unit 1210, taking the following into account.

A data concatenation corresponding to the next burst partial ID of the burst partial ID of the previously stored data concatenation, whose burst ID is equal to a burst ID of the data concatenation stored in the burst memory 1216B.

A data concatenation output from the decoder that first outputs a Store Request signal which is output after its decoding is complete.

e. When the storing of the data concatenations is done, the other decoders can efficiently use the data storage space. That is, because there is no need to configure the memory on a burst-by-burst basis and the data concatenations can be managed with one memory, the data path is simplified. In addition, because the burst size changes every frame, it is possible to manage the data concatenations with one memory regardless of the change in the burst size. The foregoing method is shown by the flowchart of FIG. 17.

Figure 17:
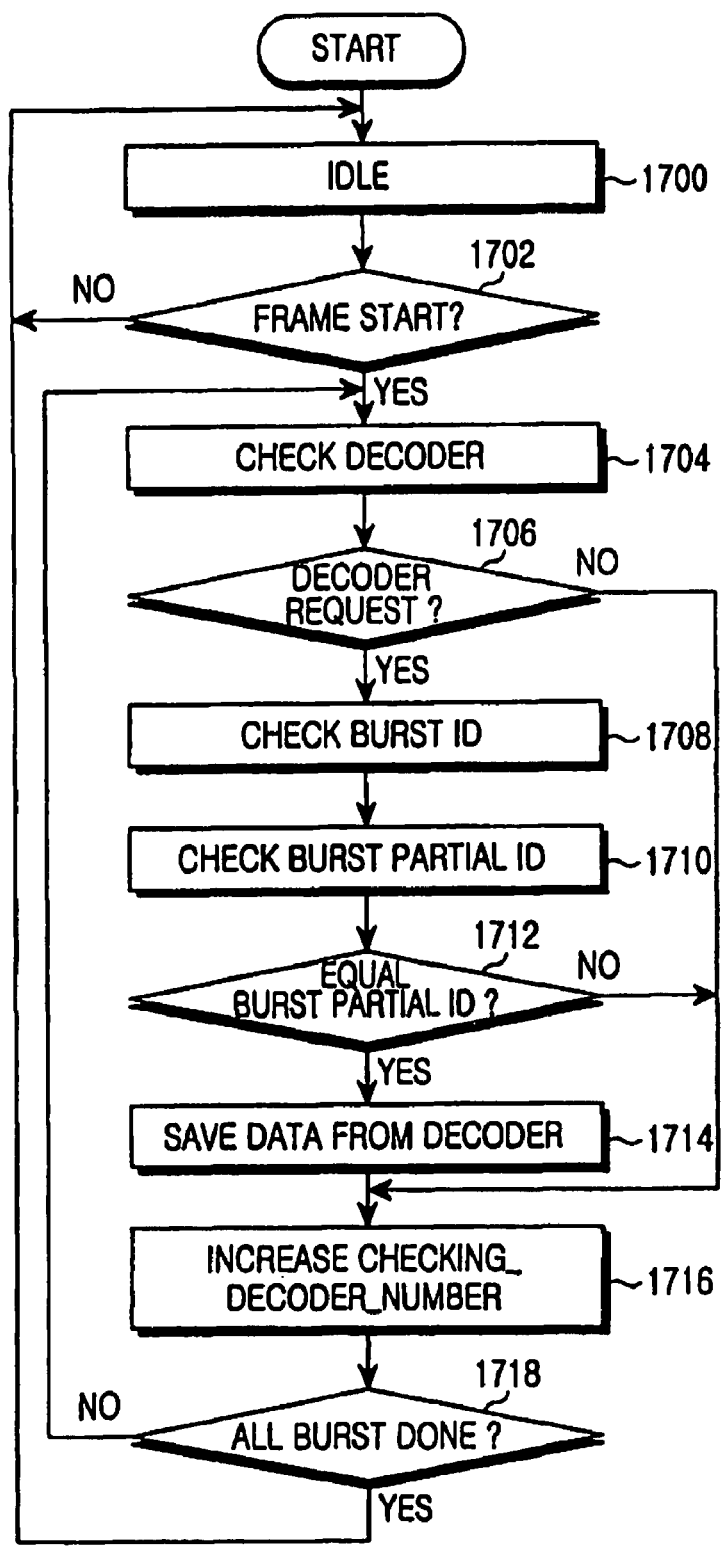
FIG. 17 is a flowchart of a burst memory controller in a burst memory unit according to the second embodiment of the present invention.

FIG. 17 is a flowchart of a burst memory controller 1216A in a burst memory unit 1216 according to the second embodiment of the present invention.

The burst memory controller 1216A, operating in an IDLE state in step 1700, proceeds to step 1702 where it determines if a frame has started. In step 1702, the burst memory controller 1216A can detect a start of the frame by means of a synchronization unit (not shown).

If the frame has started in step 1702, the burst memory controller 1216A checks in step 1704 the decoding status of decoders in the decoding unit 1210. In step 1706, the burst memory controller 1216A determines if there is a decoder that has requested the storing of the data concatenation after completing decoding on the data concatenation, among the decoders of the decoding unit 1210. If there is a Store Request signal for the decoded data concatenation from the decoder that has completed decoding in step 1706, the burst memory controller 1216A proceeds to step 1708 where it checks a burst ID of the store-requested data concatenation, thereby checking a burst including the store-requested data concatenation. Thereafter, in step 1710, the burst memory controller 1216A checks a burst partial ID.

In step 1712, the burst memory controller 1216A determines if a burst partial ID to be stored in the burst memory 1216B is equal to a burst partial ID of the store-requested data concatenation. If it is determined in step 1712 that the two burst partial IDs are equal to each other, the burst memory controller 1216*a* proceeds to step 1714 where it stores (saves) the data concatenation output from the decoding unit 1210, as the data concatenation output from the decoding unit 1210 is the data concatenation included in the equal burst. That is, the burst memory controller 1216A stores the data concatenation in the region associated with the burst partial ID. In step 1716, the burst memory controller 1216A checks the other decoders whose decoding on the data concatenation is complete. Further, the burst memory controller 1216A calculates the total number of data concatenations constituting one frame using the burst ID and burst partial ID received from the symbol scheduler 1202. In addition, the burst memory controller 1216*a* increases 'checking_decoder_number' each time it stores the data concatenation output from the decoding unit 1210 in the burst memory 1216B. If the 'checking_decoder_number' is equal to the total number of data concatenations, the burst memory controller 1216A determines that all bursts are stored as their decoding is done.

If it is determined in step 1718 that all bursts are stored in the burst memory 1216B, the burst memory controller 1216A returns to step 1700 where it waits until a new frame starts. If not all bursts are stored yet, the burst memory controller 1216A returns to step 1704 where it determines if there are any decoder whose decoding is complete, among the decoders in the decoding unit 1210. In the second embodiment of the present invention, the reason why the burst memory controller 1216A can check a burst partial ID of a store-requested data concatenation and store the data concatenation in the burst memory unit 1216 upon receipt of a Store Request signal from the decoder after checking for the presence/absence of the decoder whose decoding is complete, is because even the decoders perform decoding in units of data concatenations, and the information on the burst IDs and burst partial IDs assigned to the data concatenations by the symbol scheduler 1202 is transferred together.

Figure 18:
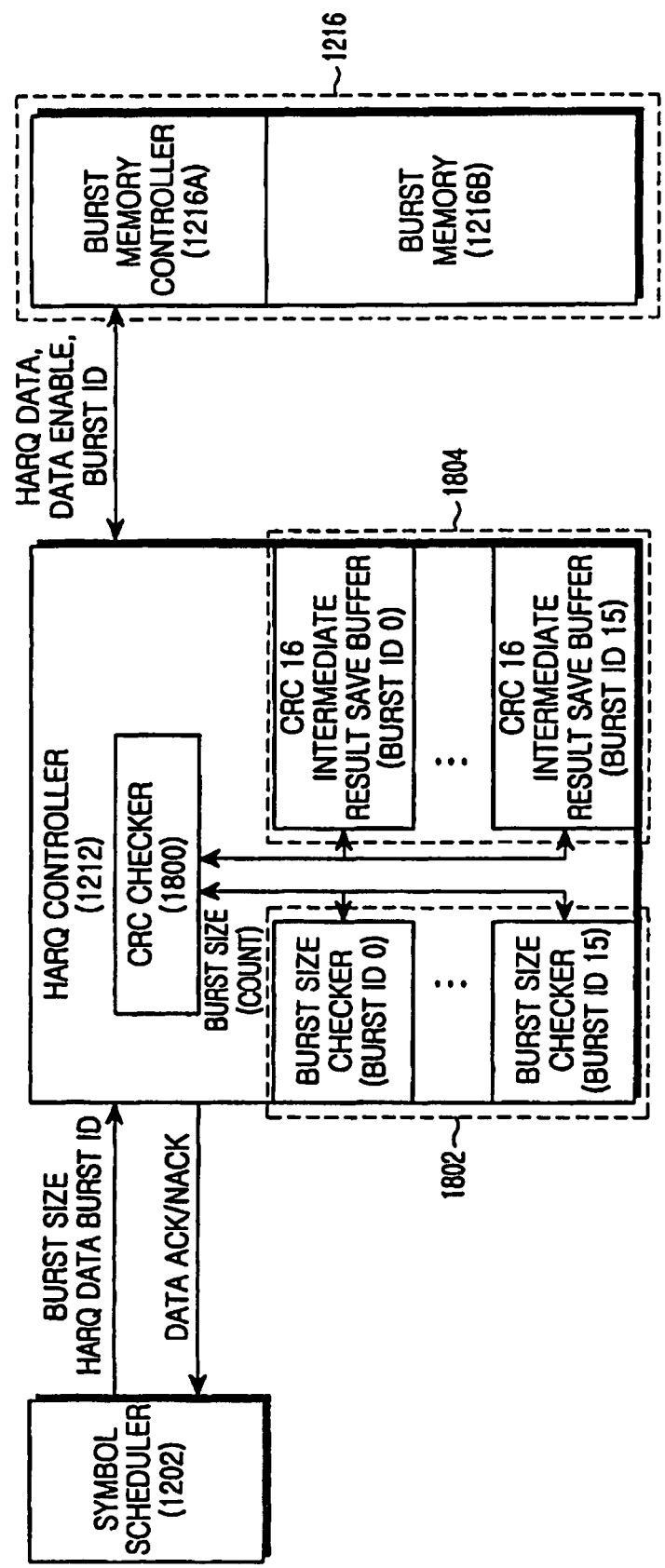
FIG. 18 is a block diagram of an HARQ controller according to the second embodiment of the present invention.

FIG. 18 is a block diagram of an HARQ controller 1212 according to the second embodiment of the present invention.

Before a description of FIG. 18 is given, it should be noted that when the received data is HARQ data, the symbol scheduler 1202 indicates the HARQ data in a burst ID included in the received data, and transfers it to the slot combiner 1204. The indication scheme can indicate, in the Most Significant Bit (MSB) bit of the burst ID, that the currently received data is HARQ data. Therefore, if the HARQ data is transferred to the burst memory unit 1216, the burst memory unit 1216 transfers the received data to the HARQ controller 1212.

Because the data output to the HARQ controller 1212 from the burst memory unit 1216 is a data concatenation other than the entire burst, the HARQ controller 1212 cannot determine ACK/NACK for the received data until it receives the entire data constituting the burst.

The HARQ controller 1212 determines ACK/NACK using the CRC result on the received data, and cannot obtain the CRC result until it reads all of the HARQ-applied data bursts from the burst memory unit 1216. However, if the HARQ controller 1212 obtains the CRC result after waiting until one data burst is fully decoded, the HARQ data processing speed decreases.

In order to increase the HARQ data processing speed, the second embodiment of the present invention uses the following schemes.

a. After acquiring the HARQ data information, the symbol scheduler 1202 outputs, to the HARQ controller 1212, the HARQ information in which burst partial ID, burst ID and burst size of the HARQ data are set.

b. Upon receipt of decoded HARQ data from the decoding unit 1210, the burst memory unit 1216 forwards the HARQ data to the HARQ controller 1212. The forwarded data is a data concatenation. When the data concatenation decoded by the decoding unit 1210 is included in the HARQ-applied HARQ burst, the burst memory controller 1216A outputs the decoded data concatenation to the HARQ controller 1212. Then the burst memory unit 1216 sequentially outputs the decoded data concatenations to the HARQ controller 1212 according to burst partial IDs, and the HARQ controller 1212 controls an HARQ operation for the corresponding bursts by checking burst IDs.

c. Upon receipt of the HARQ data from the burst memory unit 1216, the HARQ controller 1212 performs CRC calculation, and stores (saves) the result in an intermediate result save buffer unit 1804. The received data is a data concatenation. A burst size checking unit 1802 of the HARQ controller 1212 calculates a size of the input data concatenation, stores the calculated size in its internal register, and compares the calculated size of the data concatenation with the burst size preset by the burst size checking unit 1802 to determine if data concatenations having the same size as the burst size are received. In FIG. 18, the reason why there are 16 blocks #0 to #15 for checking the burst size is because there is no need for more than 16 blocks as it is defined in the 802.16e standard that a maximum of 16 bursts can be allocated to one symbol. However, the number of blocks is subject to change according to implementation.

d. If the size of data concatenations read from the burst memory unit 1216 is not equal to the burst size set in the symbol scheduler 1202, a CRC checker 1800 separately stores the CRC result calculated up to a present time in the buffer intermediate result save buffer unit 1804. Thereafter, the CRC checker 1800 can read the next data from the burst memory unit 1216. The next data is another burst or the next data concatenation.

e. Upon receipt of data of another burst, the CRC checker 1800 is initialized, and if there is a CRC calculation intermediate value for the previously received burst, the CRC checker 1800 sets (initializes) register values therein to this value.

The reason why the CRC checker 1800 initializes its interval registers to the CRC calculation intermediate value in this way is as follows.

1. One data burst is received after undergoing concatenation.

2. The CRC checker 1800 should perform CRC calculation concatenation by concatenation, and should check several bursts with one CRC calculator. Therefore, when the intermediate value of CRC calculation is stored and then the data with a burst ID corresponding to the result value is received, the CRC checker 1800 should perform CRC calculation after initializing the internal registers to the value.

The reason for storing the intermediate value of the CRC calculation result is because when several bursts coexist in one frame as the HARQ controller 1212 shares CRC calculation blocks, the CRC calculation is achieved concatenation by concatenation. That is, the CRC calculation is determined in the internal registers, and to process several data concatenations in one CRC calculation block, when the intermediate calculation value is stored and then the next data concatenation with the equal burst ID is received, the CRC checker 1800 should initialize the interval registers to the previously calculated value, so that the CRC calculation is continuously processed.

f. If the CRC calculation on as much HARQ data as the one-burst size is complete, the HARQ controller 1212 ends the CRC check, and transfers the check result on the corresponding burst to the symbol scheduler 1202 and each of the blocks (for example, burst memory unit 1216 and the HARQ combiner 1208).

When the data concatenation decoded by the decoding unit 1210 is included in the HARQ-applied HARQ burst, the HARQ controller 1212 according to the second embodiment of the present invention calculates a CRC of the decoded data concatenation, and performs CRC check on the HARQ burst using the CRC calculation values for the data concatenations when all data concatenations constituting the HARQ burst are decoded. In addition, the HARQ controller 1212 outputs an ACK or NACK signal for the HARQ burst to the symbol scheduler 1202 according to the CRC check result.

With reference to FIG. 18, a detailed description will now be made of a structure of the HARQ controller 1212.

FIG. 18 illustrates a structure designed to support a maximum of 16 data bursts #0 to #15. When the foregoing scheme performs CRC check on the burst composed of HARQ data, it has no need to wait until one burst is fully decoded, thereby increasing the data processing speed.

In FIG. 18, the symbol scheduler 1202 transfers burst size information and HARQ data burst ID to the HARQ controller 1212. The HARQ controller 1212 performs CRC calculation on each of the HARQ data received from the burst memory unit 1216, and can obtain the CRC result for all burst using the CRC calculated value when HARQ data is received as much as the same size as the one-burst size. The symbol scheduler 1202 transfers ACK/NACK, or the CRC result obtained up to then, to the symbol scheduler 1202.

When HARQ data is received from the decoding unit 1210, the burst memory controller 1216A of the burst memory unit 1216 stores the HARQ data in the burst memory 1216B and outputs it to the HARQ controller 1212. When transferring the HARQ data to the HARQ controller 1212, the burst memory controller 1216A also transfers a 'Data enable' signal indicating the transfer of the HARQ data, and a burst ID indicating to which burst the corresponding HARQ data belongs.

One bit of the burst ID can be used for the information indicating whether the HARQ data being transferred to the HARQ controller 1212 is HARQ data. The CRC checker 1800 of the HARQ controller 1212, as described above, performs CRC calculation on the received HARQ data. As described above, the blocks for checking a burst size separately for each burst ID can be realized in the burst size checking unit 1802, and if the size of the data concatenations currently received at the HARQ controller 1212 is different from the burst size of the corresponding ID, the burst size checking unit 1802 allows the CRC checker 1800 to store the CRC calculation result on the received HARQ data in the intermediate result save buffer unit 1804.

That is, the CRC checker 1800 stores the CRC calculation value of every data concatenation, or the CRC calculated value for the HARQ data received up to a present time, in the intermediate result save buffer unit 1804. However, if the total size of the received data concatenations is equal to a predetermined burst size, the burst size checking unit 1802 allows the CRC checker 1800 to transfer ACK/NACK, or the CRC check result for the corresponding burst, to the symbol scheduler 1202.

For example, if one burst is composed of three data concatenations, the CRC checker 1800 stores a first CRC calculation value, or a CRC calculation result on a first data concatenation, in the intermediate result save buffer unit 1804. When a second data concatenation is received, the CRC checker 1800 stores a second CRC calculation value, or a CRC calculation result on the second data concatenation, in the intermediate result save buffer unit 1804. Thereafter, when the last third data concatenation of one burst is received, the CRC checker 1800 compares the final CRC calculation result with the CRC value transmitted by the transmitter, and determines ACK or NACK for the burst.

Figure 19:
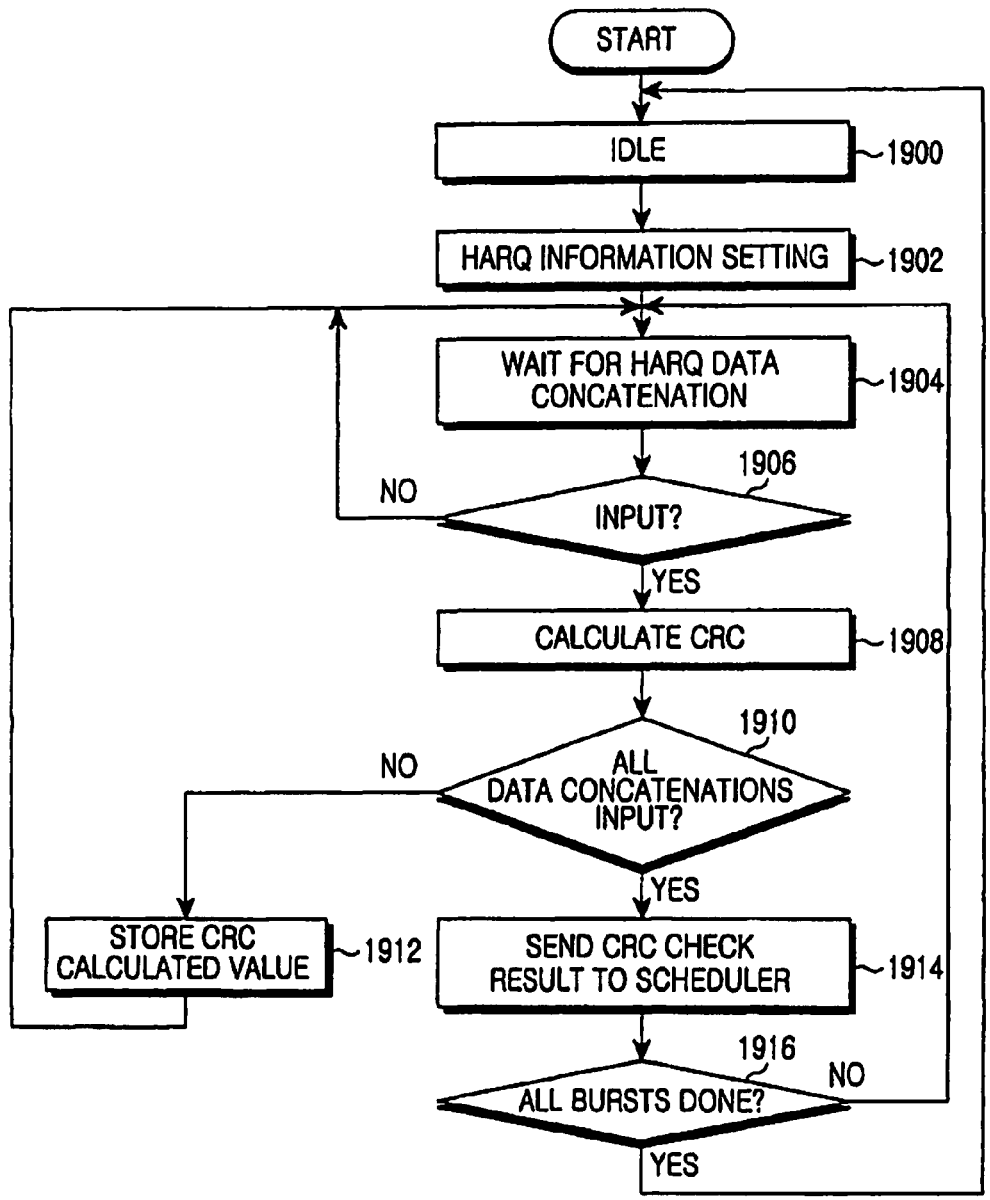
FIG. 19 is a flowchart of an HARQ controller according to the second embodiment of the present invention.

FIG. 19 is a flowchart of an HARQ controller 1212 according to the second embodiment of the present invention.

The HARQ controller 1212, waiting in an IDLE state in step 1900, recognizes a change in the frame size and sets HARQ information such as HARQ data size and burst information in step 1902.

In step 1904, the HARQ controller 1212 waits until an HARQ data concatenation is received. If HARQ data starts to be received in step 1906, the HARQ controller 1212 performs CRC calculation thereon in step 1908, and determines in step 1910 if the data concatenations of a corresponding burst having a predetermined burst size are all received.

If it is determined in step 1910 that the data concatenations corresponding to the corresponding burst size are not all received, the HARQ controller 1212 proceeds to step 1912 where it stores the CRC value calculated up to the present time in the intermediate result save buffer unit 1804 with an ID of the corresponding burst. However, if it is determined in step 1910 that as many data concatenations as a predetermined burst size are all received, the HARQ controller 1212 transfers a CRC result on the determined burst to the symbol scheduler 1202 in step 1914. The HARQ controller 1212 determines in step 1916 if the CRC check is complete for all bursts. If the CRC check is complete, the HARQ controller 1212 returns to step 1900 where it waits in the IDLE state. However, if it is determined in step 1916 that the CRC check is not complete for all bursts, the HARQ controller 1212 returns to step 1904 where it waits until an HARQ data concatenation is received from the burst memory unit 1216.

As is apparent from the foregoing description, the present invention provides the structure by which the receiver restores the data transmitted by the base station in the broadband wireless communication system. The present invention provides the following advantages.

The present invention processes the received data on a symbol-by-symbol basis, thereby contributing to an increase in the data processing speed.

The present invention performs decoding and CRC check on the received data concatenations on a symbol-by-symbol basis before the entire burst is buffered in the channel estimator buffer, contributing to a reduction in the total buffer size.

Control for data processing is simplified.

HARQ data can be efficiently processed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for processing data of a received frame in a receiver of a broadband wireless communication system, the method comprising the steps of;
    extracting, from control information for data of one frame having multiple bursts, burst sizes of the bursts constituting the frame and modulation scheme information applied to the frame;
    assigning burst identifiers (IDs) used for identifying the bursts;
    dividing the bursts into data concatenations;
    assigning burst partial IDs to the data concatenations having concatenation sizes based on the burst sizes and the modulation scheme information;
    forming, in a memory, burst regions for storing the data concatenations according to the burst IDs;
    dividing received data of one slot included in the frame into data concatenations based on the concatenation sizes, and decoding the data concatenations; and
    sequentially storing the decoded data concatenations in the memory according to a burst ID and a burst partial ID corresponding to each of the decoded data concatenations,
    wherein the burst partial ID includes sequence information of the data concatenations.

2. The method of claim 1, wherein if the decoded data concatenation is a data concatenation to be stored, storing the decoded data concatenation in the memory after a previously stored data concatenation.

3. The method of claim 1, wherein if the decoded data concatenation is not a data concatenation to be stored, waiting, without storing the decoded data concatenation in the memory, until a data concatenation corresponding to a next burst partial ID of a burst partial ID of a data concatenation previously stored in the memory is output after being decoded.

4. The method of claim 1, wherein if there is no data concatenation stored in a burst region corresponding to the burst ID, in which the decoded data concatenation is included, storing the decoded data concatenation in a first position of the burst region.

5. The method of claim 1, further comprising:
    if the decoded data concatenation is included in a Hybrid Automatic ReQuest (HARQ) burst to which HARQ is applied, calculating a Cyclic Redundancy Check (CRC) of the decoded data concatenation;

if all data concatenations constituting the HARQ burst are decoded, performing CRC check on the HARQ burst using the CRC calculation values for the data concatenations; and sending an Acknowledge (ACK) signal or a Not-Acknowledge (NACK) signal for the HARQ burst according to the CRC check result.

6. An apparatus for processing data of a received frame in a receiver of a broadband wireless communication system, the apparatus comprising:
   a control information decoder for receiving control information for data of one frame having multiple bursts, and decoding the received control information;
   a controller for extracting, from the decoded control information, burst sizes of the bursts constituting the frame and modulation scheme information applied to the frame, assigning burst identifiers (IDs) used for identifying the bursts, dividing the bursts into data concatenations, and assigning burst partial IDs to the data concatenations having concatenation sizes based on the burst sizes and the modulation scheme information;
   a decoding unit for dividing received data of one slot included in the frame into data concatenations based on the data concatenation sizes, and decoding the data concatenations; and
   a burst memory unit having burst regions for storing the data concatenations according to the burst IDs, the burst memory unit sequentially storing the decoded data concatenations according to a burst ID and a burst partial ID corresponding to each of the decoded data concatenations output from the decoding unit,
   wherein the burst partial ID includes sequence information of the data concatenations.

7. The apparatus of claim 6, wherein if the decoded data concatenation is a data concatenation to be stored, the burst memory unit stores the decoded data concatenation after a previously stored data concatenation.

8. The apparatus of claim 6, wherein if the decoded data concatenation is not a data concatenation to be stored, the burst memory unit waits, without storing the decoded data concatenation, until a data concatenation corresponding to a next burst partial ID of a burst partial ID of a previously stored data concatenation is output after being decoded.

9. The apparatus of claim 6, wherein if there is no data concatenation stored in a burst region corresponding to the burst ID, in which the decoded data concatenation is included, the burst memory unit stores the decoded data concatenation in a first position of the burst region.

10. The apparatus of claim 6, further comprising a Hybrid Automatic ReQuest (HARQ) controller for, if the decoded data concatenation is included in an HARQ burst to which HARQ is applied, calculating a Cyclic Redundancy Check (CRC) of the decoded data concatenation;
   if all data concatenations constituting the HARQ burst are decoded, performing CRC check on the HARQ burst using the CRC calculation values for the data concatenations; and
   sending an Acknowledge (ACK) signal or a Not-Acknowledge (NACK) signal for the HARQ burst according to the CRC check result.

* * * * *